(12) United States Patent
Lane et al.

(10) Patent No.: US 11,394,115 B2
(45) Date of Patent: Jul. 19, 2022

(54) ARRAY CALIBRATION THRU POLARIZATION CROSS-COUPLING

(71) Applicant: Mixcomm, Inc., Chatham, NJ (US)

(72) Inventors: Frank Lane, Easton, PA (US); Arun Natarajan, Corvallis, OR (US); Aristotele Hadjichristos, San Diego, CA (US); Harish Krishnaswamy, New York, NY (US)

(73) Assignee: Mixcomm, Inc., Chatham, NJ (US)

( * ) Notice: Subject to any disclaimer, the term of this patent is extended or adjusted under 35 U.S.C. 154(b) by 0 days.

(21) Appl. No.: 17/118,468

(22) Filed: Dec. 10, 2020

(65) Prior Publication Data

US 2021/0399417 A1   Dec. 23, 2021

Related U.S. Application Data

(60) Provisional application No. 63/042,544, filed on Jun. 22, 2020.

(51) Int. Cl.
*H04B 17/14* (2015.01)
*H01Q 3/26* (2006.01)
*H04B 7/10* (2017.01)

(52) U.S. Cl.
CPC .......... *H01Q 3/267* (2013.01); *H01Q 3/2694* (2013.01); *H04B 7/10* (2013.01)

(58) Field of Classification Search
CPC .......... H04B 7/10; H04B 17/14; H04B 17/11; H01Q 3/26; H01Q 3/267; H01Q 3/2694
See application file for complete search history.

(56) References Cited

U.S. PATENT DOCUMENTS

| | | | | |
|---|---|---|---|---|
| 5,657,023 | A | * | 8/1997 | Lewis .................... H01Q 3/267 342/174 |
| 8,154,452 | B2 | * | 4/2012 | Webb .................... H01Q 3/267 342/368 |
| 2005/0085197 | A1 | | 4/2005 | Laroia et al. |
| 2008/0172194 | A1 | | 7/2008 | Mochizuki et al. |
| 2014/0269554 | A1 | | 9/2014 | Shapira et al. |
| 2016/0049995 | A1 | * | 2/2016 | Andre ...................... H04B 7/04 370/277 |
| 2016/0191176 | A1 | | 6/2016 | O'Keeffe et al. |
| 2017/0223559 | A1 | | 8/2017 | Kong et al. |

(Continued)

FOREIGN PATENT DOCUMENTS

WO   WO-2018166575 A1 *   9/2018   ............. H01Q 3/267

OTHER PUBLICATIONS

International Search Report and Written Opinion of the International Searching Authority from PCT/US2021/038148, dated Sep. 23, 2021, 1-11 pages.

(Continued)

*Primary Examiner* — Blane J Jackson
(74) *Attorney, Agent, or Firm* — Straub & Straub; Michael P. Straub; Stephen T. Straub

(57) ABSTRACT

Methods and apparatus for calibrating signal processing chains using cross coupling between polarizations are described. Various exemplary methods and apparatus, in accordance with the present invention, are well suited for use in communications devices using beamforming and including arrays of TX/RX front ends, e.g., a first plurality of horizontal polarization front ends and a second plurality of vertical polarization front ends.

19 Claims, 21 Drawing Sheets

(56) References Cited

U.S. PATENT DOCUMENTS

| | | | |
|---|---|---|---|
| 2018/0316091 A1* | 11/2018 | Tankielun | H04B 17/102 |
| 2019/0025403 A1* | 1/2019 | Hoffman | H04B 17/3912 |
| 2019/0334636 A1* | 10/2019 | Li | H04B 7/0617 |
| 2020/0280128 A1* | 9/2020 | Rafique | H04B 17/14 |
| 2021/0159594 A1* | 5/2021 | Tiebout | H04B 17/12 |

OTHER PUBLICATIONS

Bertrand et al. "Experimental antenna array calibration with artificial neural networks." Signal processing 88.5 (2008): 1152-1164. Nov. 28, 2007 (Nov. 28, 2007) Retrieved on Aug. 16, 2021 (Aug. 16, 2021) from <http://lrts.gel.ulaval.ca/publications/uploadPDF/publication_58.pdf>, 14 pages.

* cited by examiner

FIGURE 6

| FIGURE 13A |
| FIGURE 13B |
| FIGURE 13C |
| FIGURE 13D |

ARRAY CALIBRATION THRU POLARIZATION CROSS-COUPLING

RELATED APPLICATIONS

The present application claims the benefit of U.S. Provisional Application Ser. No. 63/042,544 which was filed on Jun. 22, 2020 and which is hereby expressly incorporated by reference in its entirety.

FIELD

The present application relates to calibration methods and apparatus for wireless communications devices, and more particularly, to calibrating arrays of transmit/receive (TX/RX) front ends thru polarization cross coupling.

BACKGROUND

The relative phase shift in each element of a phased array should be known for every phase shifter/gain setting of an array to enable accurate beam formation. Similarly, the actual transmit (TX) radiated signal is required to determine how non-linearities/non-idealities in the TX signal chain impact Error Vector Magnitude (EVM). For both these parameters to be measured accurately a complete Transmit Receive (TX RX) chain should be used. For example, the signal through the TX is downconverted and measured to determine EVM. However, tight area constraints/absence of a Local Oscillator (LO) make it difficult to include a downconverter or an upconverter in each integrated circuit (IC), particularly in a design including a large array of ICs. In addition, if the TX radiated signal is sensed on-chip, then gain/phase imperfections due to feed line and antennas are not included in the calibration, resulting in a lower accuracy calibration.

A conventional approach to calibration of an array of ICs is to place a low-power receiver or signal source in each IC, which can be costly both in terms of the price of the additional components and the additional physical area required for the implementation. In addition, the conventional approach calibrates imperfections up to the IC output, but not including error contributions due to antenna feed lines and antenna elements, since the signal sensing point is on-chip instead of at the antennas resulting in an imprecise calibration.

Based on the above discussion, there is a need for new methods and apparatus for calibrating arrays of signal processing chains.

SUMMARY

Methods and apparatus for calibrating signal processing chains using cross coupling between polarizations are described. Various exemplary methods and apparatus, in accordance with the present invention, are well suited for use in communications devices using beamforming and including arrays of TX/RX front ends, e.g., a first plurality of horizontal polarization front ends and a second plurality of vertical polarization front ends.

A signal processing chain including a horizontal polarization TX/RX front end, an antenna feed line and a horizontal polarization antenna element is calibrated, while set to TX mode, by using: a vertical polarization TX/RX front end (set to RX mode), an antenna feed line and a vertical polarization antenna element. Test signals transmitted via the horizontal polarization antenna element are received by the vertical polarization antenna element and then processed and measured to determine errors and generate calibration values.

A signal processing chain including a vertical polarization TX/RX front end, an antenna feed line and a vertical polarization antenna element is calibrated, while set to TX mode, by using: a horizontal polarization TX/RX front end (set to RX mode), an antenna feed line and a horizontal polarization antenna element. Test signals transmitted via the vertical polarization antenna element are received by the horizontal polarization antenna element and then processed and measured to determine errors and generate calibration values.

The approach, in accordance with the present invention of making use of one or more receive chains already present within the communications device for performing calibration of a transmit chain reduces the need for additional test hardware needing to be populated within the communications device. In addition, the approach in accordance with the present invention, of using polarization cross coupling to perform the calibration facilitates the calibration of errors due to antenna feed lines and antenna elements, in addition to the calibration of errors due to the TX/RX front end component, e.g. TX/RX front end chip.

An exemplary method of calibrating a plurality of signals processing chains of a communications device, in accordance with some embodiments, comprises: setting a first gain control value (used to control a first gain element) to a first value to control a first gain element in a first signal processing chain; transmitting a first test signal from a first antenna element of the first signal processing chain of said plurality of signal processing chains, said first antenna element have a first polarization, said first polarization being a horizontal polarization or a vertical polarization; receiving the first test signal using a second antenna element of a second signal processing chain of said plurality of signal processing chains, said second antenna element having a second polarization, said second polarization being different from said first polarization and being one of a horizontal polarization or a vertical polarization; measuring the received first test signal, wherein measuring the received first test signal includes determining a received signal strength; determining an amplitude error corresponding to the first received test signal; and generating a first amplitude adjustment value for the first gain element of the first signal processing chain based on the measured received signal strength of the received first test signal. In some such embodiments, the first signal processing chain further includes a first phase shift element, and the method further comprises: setting a first phase shift control value (used to control a first phase shift element) to a second value to control the first phase shift element in the first signal processing chain; wherein measuring the received first test signal further includes measuring the phase of the received first test signal; determining a phase error corresponding to the first received test signal; and generating a first phase shift adjustment value for the first phase shift element of the first signal processing chain based on the measured received signal phase of the received first signal.

An exemplary communications method, in accordance with some embodiments, comprises: setting a first plurality of signal processing chains in an array of signal processing chains to operate in a transmit mode of operation, signal processing chains in the first plurality of signal processing chains having a first polarization; setting a second plurality of signal processing chains, in the array of signal processing chains to operating in a receive mode of operation, said second plurality of signal processing chains having a second polarization which is different from said first polarization; generating a first test signal; transmitting the first test signal using the first plurality of signal chains having the first polarization, each individual signal processing chain transmitting the test signal via an antenna element corresponding to the individual signal processing chain; receiving the transmitted first test signal using the second plurality of signal processing chains, each of the second plurality of signal chains using an antennal element corresponding the individual signal processing chain to receive the test signal; and determining based on the signals received by the second plurality of signal processing chains non-idealities in the transmitted signal that was received by the second plurality of signal processing chains.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 6 is a drawing of an exemplary table illustrating exemplary control settings for an example in which horizontal polarization front end H1, operating in TX mode, is to be calibrated, with regard to gain and phase adjustments, using vertical polarization front end V1 as the receiver, e.g., in a closed calibration loop, with H1 coupled to V1 via antenna feeds and antenna elements, one horizontal polarization antenna element and one vertical antenna polarization antenna element, and using vertical polarization front end V2 as the receiver, e.g., in a closed calibration loop, with H1 coupled to V2 via antenna feeds and antenna elements, one horizontal polarization antenna element and one vertical antenna polarization antenna element.

DETAILED DESCRIPTION

Figure 1:
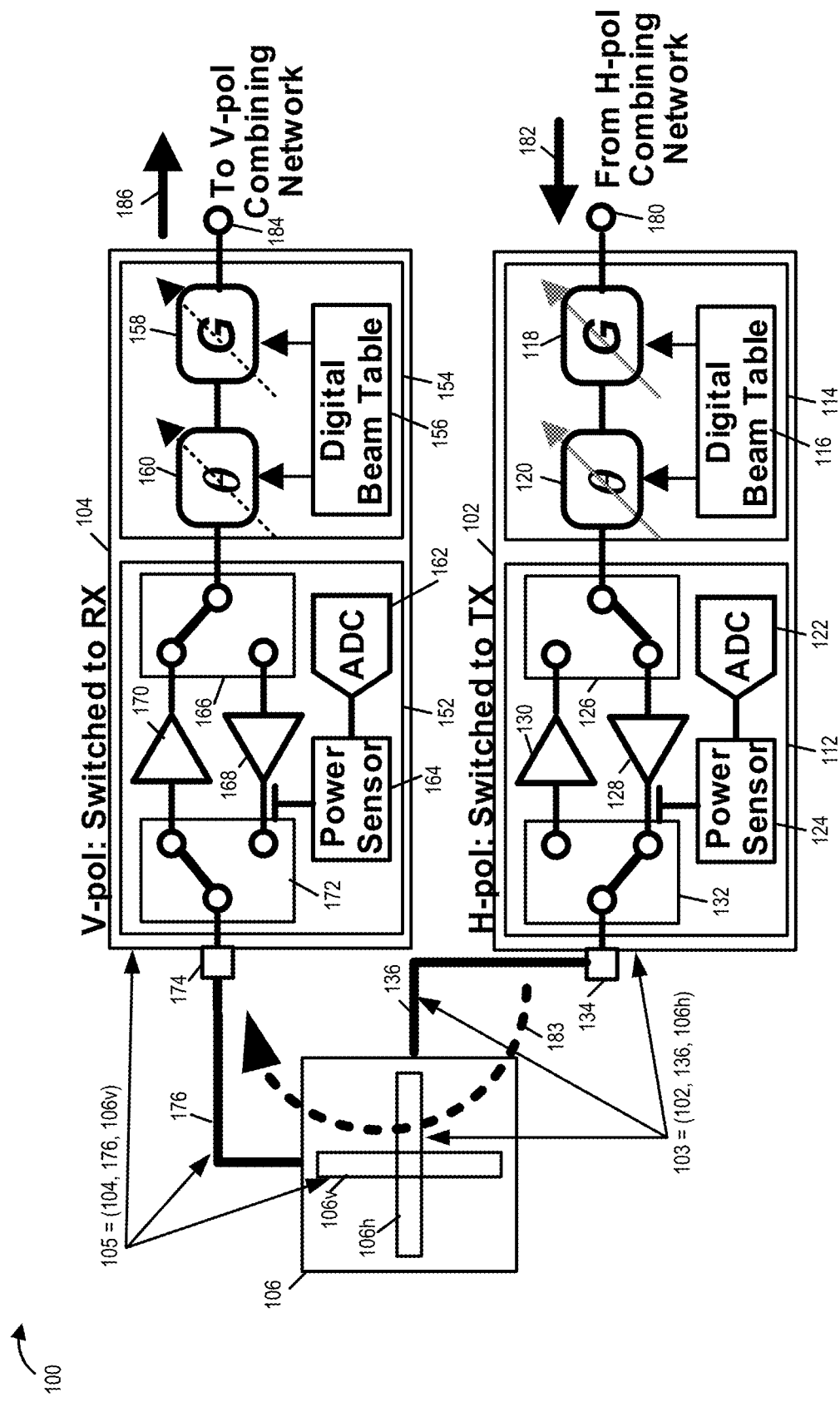
FIG. 1 is a drawing illustrating an exemplary Horizontal-polarization element front-end, switched to TX mode, coupled to an exemplary Vertical polarization element front-end, switched to RX mode, via a first antenna lead line, a horizontal polarization antenna element, a vertical polarization antenna element, and a second antenna lead line, which are used to calibrate gain and phase errors, in accordance with an exemplary embodiment.

FIG. 1 is a drawing 100 illustrating an exemplary Horizontal-polarization element front-end 102, switched to TX mode, coupled to an exemplary Vertical polarization element front-end 104, switched to RX mode, via a first antenna lead line 136, a horizontal polarization antenna element 106h, a vertical polarization antenna element 106v, and a second antenna lead line 174, which are used to calibrate gain and phase errors, in accordance with an exemplary embodiment.

As shown in FIG. 1, the signal 183 in the TX path in the Horizontal-polarization (H-pol) element 102, which is switched to TX mode, is coupled to the RX path in the Vertical-polarization (V-pol) element 104, which is switched to RX mode. The gain and phase of the path can be, and sometimes is, measured using the signal loopback from the TX to RX. Based on the measurements, calibration values and determined and subsequently used.

Exemplary horizontal-polarization element 102, e.g., a TX/RX front end circuit, e.g., included as part of an IC chip, includes an adjustable gain/adjustable phase component 114 coupled to antenna element interface circuitry 112. The adjustable gain/adjustable phase component 114 includes a controllable adjustable gain element 118, a controllable adjustable phase element 120, and a digital beam table component 116. The controllable adjustable gain element 118, and controllable adjustable phase element 120, may be, and sometimes are, set at various different levels during a calibration process. In addition, when operating, as part of beamforming, e.g., during post calibration normal operations, the controllable adjustable gain element 118, and controllable adjustable phase element 120, are set at particular values, e.g., in accordance with information in the digital beam table, e.g., to produce a desired beam at a particular time.

Antenna element interface circuitry 112 includes a first controllable TX/RX switch 126, an RF TX amplifier 128, e.g., a power amplifier (PA), an RF RX amplifier 130, e.g., a low noise amplifier (LNA), a second controllable TX/RX switch 132, a power sensor 124 and an analog to digital convertor (ADC) 122, coupled together as shown. The power sensor 124 measures TX power which is being output from TX amplifier 128. ADC 122 converts a measured TX power level analog signal to generate a digital signal representative of the measured power level. TX/RX switches (126, 132) are controlled to be in either a transmit mode or a receive mode, e.g. at a given time, and are shown in FIG. 1 to be currently in TX mode.

Terminal 180, which is connected to controllable gain element 118, receives input signals 182, e.g., test signals used for calibration, from a horizontal polarization combining network. Terminal 134 is connected to the wiper arm terminal of second TX/RX switch 132 and to antenna lead 136. Antenna lead 136 is connected to horizontal polarization antenna element 106h of antenna 106.

Exemplary vertical-polarization element 104, e.g., a TX/RX front end circuit, e.g., included as part of an IC chip, includes an adjustable gain/adjustable phase component 154 coupled to antenna element interface circuitry 152. The adjustable gain/adjustable phase component 154 includes a controllable adjustable gain element 158, a controllable adjustable phase element 160, and a digital beam table component 156. The controllable adjustable gain element 158, and controllable adjustable phase element 160, may be, and sometimes are, set at various different levels during a calibration process. In addition, when operating, as part of beamforming, e.g., during post calibration normal operations, the controllable adjustable gain element 158, and controllable adjustable phase element 160, are set at particular values, e.g., in accordance with information in the digital beam table 156, e.g., to receive a desired beam at a particular time.

Antenna element interface circuitry 152 includes a first controllable TX/RX switch 166, an RF TX amplifier 168, e.g., a power amplifier, an RF RX amplifier 170, e.g., a low noise amplifier, a second controllable TX/RX switch 132, a power sensor 164 and an analog to digital convertor (ADC) 162, coupled together as shown. The power sensor 164 measures TX power which is being output from TX amplifier 168. ADC 162 converts a measured TX power level analog signal to generate a digital signal representative of the measured power level. TX/RX switches (166, 172) are controlled to be in either a transmit mode or a receive mode, e.g. at a given time, and are shown in FIG. 1 to be currently in RX mode.

Terminal 184, which is connected to controllable gain element 158, receives output signals 186, e.g., signals produced as part of the calibration, which are sent to a vertical polarization combining network. Terminal 174 is connected to the wiper arm terminal of second TX/RX switch 172 and to antenna lead 176. Antenna lead 176 is connected to vertical polarization antenna element 106v of antenna 106.

Signal processing chain 103 includes horizontal-polarization element 102, e.g., a TX/RX front end circuit, antenna feed line 136 and horizontal polarization antenna element 106h. Signal processing chain 105 includes vertical-polarization element 104, e.g., a TX/RX front end circuit, antenna feed line 176 and vertical polarization antenna element 106v.

Figure 2:
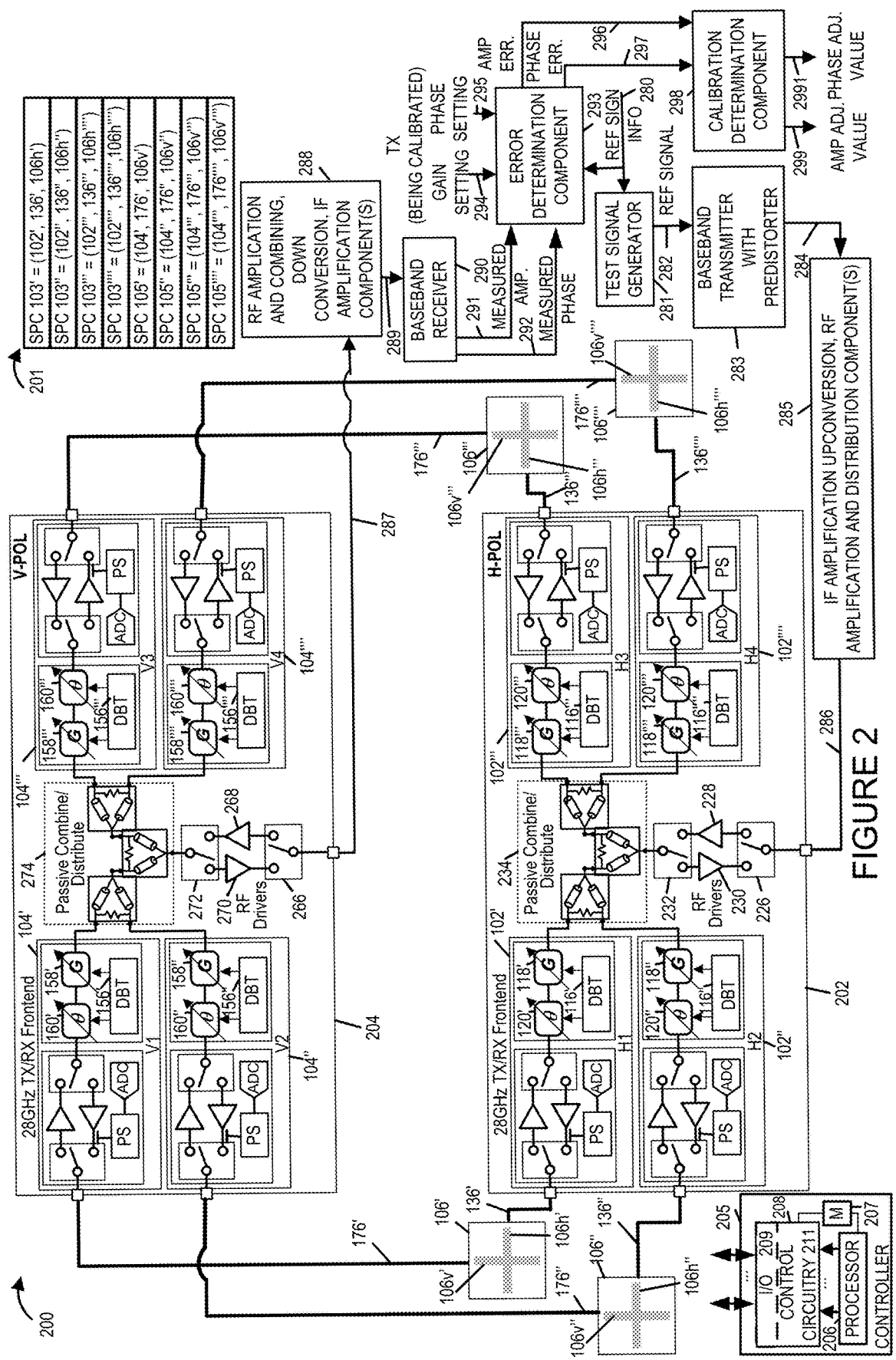
FIG. 2 is a drawing of an exemplary system including a horizontal polarization (H-POL) circuit board including an array of Horizontal-polarization element front-ends, a vertical polarization (V-POL) circuit board including an array of Vertical-polarization element front-ends, a plurality of antenna elements, coupling circuitry and calibration circuitry, which is used to calibrate gain and phase errors, in accordance with an exemplary embodiment.

As shown in FIG. 2, the exemplary approach for calibration of gain and phase using a horizontal polarization front end element coupled to a vertical polarization front end element via a first antenna feed line, a horizontal polarization antenna element, a vertical polarization antenna element, and a second antenna feed line, in accordance with some embodiments of the present invention, is extended to an array where polarization coupling across elements in the array is used to sequentially measure the relative gain and phase of each TX element.

FIG. 2 is a drawing of an exemplary system 200 including a horizontal polarization (H-POL) circuit board 202, a vertical polarization (V-POL) circuit board 204, a controller 205, a plurality of antenna (antenna 106', antenna 106'', antenna 106''', antenna 106'''') a test signal generator 281, a baseband transmitter with predistorter 283, Intermediate Frequency (IF) upconversion, radio frequency (RF) amplification and distribution component(s) 285, RF amplification and combining, downconversion, and IF amplification component(s) 288, a baseband receiver 290, an error determination component 293, and a calibration determination component 296 coupled together as shown. The controller 205 may be and sometimes is implemented as a microprocessor. The components on the circuit boards 202, 204 are processing chains. The controller 205 includes in at least some embodiments a processor 206, a calibration controller 208 and memory 207. The calibration controller 208 includes input/output (I/O) circuitry 209 and control circuitry 211. The I/O circuitry 209 operates as a signal interface while control circuitry 211 generates control signals under direction of processor 206. Memory 207 stored control signal values generated by the calibration determination component, error values generated by the error determination component, gain and/or phase setting values as well as instructions used to control the processor 206 of the controller 205. Under control of the controller 205, which may be a microcontroller or microprocessor, the system 200 is operated to implement the method described in one or more of the flow charts included in the present application.

H-POL circuit board 202 includes transmit/receive switch 226, RF receive driver 230, RF transmit driver 228, transmit/receive switch 232, a passive combine/distribute circuit 234, and a plurality of H-POL TX/RX Frontends, e.g., 28 GHz H-POL TX/RX Front ends, (H1 TX/RX Frontend circuit 102', H2 TX/RX Frontend circuit 102", H3 TX/RX Frontend circuit 102''', H4 TX/RX Frontend circuit 102'''') coupled together as shown. Antenna feed lead 136' couples H1 TX/RX frontend circuit 102' to horizontal polarization antenna element 106h' of antenna 106'. Antenna feed lead 136" couples H2 TX/RX frontend circuit 102" to horizontal polarization antenna element 106h" of antenna 106". Antenna feed lead 136''' couples H3 TX/RX frontend circuit 102''' to horizontal polarization antenna element 106h''' of antenna 106'''. Antenna feed lead 136'''' couples H4 TX/RX frontend circuit 102'''' to horizontal polarization antenna element 106h'''' of antenna 106''''.

V-POL circuit board 204 includes transmit/receive switch 266, RF receive driver 270, RF transmit driver 268, transmit/receive switch 272, a passive combine/distribute circuit 274, and a plurality of V-POL TX/RX Frontends, e.g., 28 GHz V-POL TX/RX Front ends, (V1 TX/RX Frontend circuit 104', V2 TX/RX Frontend circuit 104", V3 TX/RX Frontend circuit 104''', V4 TX/RX Frontend circuit 402'''') coupled together as shown. Antenna feed lead 176' couples v1 TX/RX frontend circuit 104' to vertical polarization antenna element 106v' of antenna 106'. Antenna feed lead 176" couples V2 TX/RX frontend circuit 104" to vertical polarization antenna element 106v" of antenna 106". Antenna feed lead 176''' couples V3 TX/RX frontend circuit 104''' to vertical polarization antenna element 106v''' of antenna 106'''. Antenna feed lead 176'''' couples V4 TX/RX frontend circuit 104'''' to vertical polarization antenna element 106v'''' of antenna 106''''.

Assume that the T/R switches on the H-POL circuit board 202 are set to receive and the T/R switches on the V-POL circuit board 204 are set to transmit.

Reference signal information 280 is input to test signal generator 281 and to error determination component 293. The test signal generator 281 uses the input reference signal information 280 to generate reference signal 282. Reference signal 282 is input to baseband transmitter 283, which includes a predistorter. The Baseband transmitter 283 generates a baseband signal 284 which is input to component(s) 284, which generates and outputs RF signal 286, which is input to the H-POL circuit board. The received signal is input to RF driver 228 and then input to passive combine/distribute circuit 234, which feeds the signal to the controllable variable gain component of each of the H-Pol frontends 102', 102", 102''', 102'''. Depending upon the gain and phase settings within the a H-Pol front end (102, 102", 102''', 102''''), the H-Pol front end (102, 102", 102''', 102'''') may, and sometimes does output a transmit signal to its antenna feed line (136, 136", 136''', 136''''), respectively, which is coupled to H-pol antenna element (106h', 106h", 106h''', 106h''''), respectively.

There is coupling between an H-pol antenna element and a V-Pol antenna element. The V-Pol antenna elements receive a signal transmitted from H-Pol antenna element. Based on the gain setting of the controllable variable gain elements in the V-POL front ends (104', 104", 104''', 104''''), a V-Pol front end (104', 104", 104''', 104''''), may and sometimes does, output a processed signal. In some embodiments, the gain setting in a V-Pol front end (104', 104", 104''', 104'''') is set to 0 to stop processing of the received signals. In some embodiments, the gain setting in one of the V-Pol front end (104', 104", 104''', 104'''') is set to a predetermined value, e.g., 1, to process received signals sourced from one of the H-Pol front ends, e.g. as part of a calibration process. The V-Pol front end, which is set to process signals, outputs a processed signal 287 to the passive combine/distribute circuit 274, which outputs a signal to RF driver 266, and then out of the V-POL circuit board 204 to the input of component(s) 288. Component(s) 288 processes the signal 287, e.g., performing RF amplification, downconversion, and IF amplification, and outputting a resulting baseband signal 289 to baseband receiver 290. The baseband receiver 290 measures the baseband signal 289 and outputs a measured amplitude 291 and a measured phase 292, which are input to the error determination component 293. The error determination component 293, uses the gain setting 294 and the phase setting 295, corresponding to the H-Pol TX/RX front end element, e.g., H1 TX·RX front end 102', being calibrated, and the reference signal information 293, to determine a amplitude error 296 and a phase error. The amplitude error 296 and phase error 297 are input to calibration determination component 298. The calibration determination component 298 determines an amplitude adjustment value 299 and a phase adjustment value 2991. In various embodiments, the determined amplitude adjustment value 299 and determined phase adjustment value 2991 are used to update the digital beam table of the front end being calibrated, e.g., the DBT of H-POL TX/RX front end element 102'.

FIG. 2 is shown for an exemplary calibration configuration in which the H-Pol front ends (102', 102", 102''', 102'''') of H-Pol circuit board 202 are set to transmit and the V-Pol front ends (104', 104", 104''', 104'''') of V-Pol circuit board 204 are set to receive. It should be appreciated that the calibration process is repeated for an exemplary calibration configuration in which the V-Pol front ends (104', 104", 104''', 104'''') of V-Pol circuit board 204 are set to transmit and the H-Pol front ends (102', 102", 102''', 102'''') of H-Pol circuit board 202 are set to receive. In such a calibration configuration, the IF amplification upconversion, RF amplification and distribution component(s) 285, are coupled to the input of switch 266 of V-Pol circuit board 294, and the RF amplification, combining, downconversion, and IF amplification components(s) 288 are coupled to the output of switch 226.

FIG. 2 further includes legend 201, which identifies components of the signal processing chains shown in FIG. 2. Signal processing chain 103' includes horizontal-polarization element 102', e.g., a TX/RX front end circuit, antenna feed line 136' and horizontal polarization antenna element 106h'. Signal processing chain 103" includes horizontal-polarization element 102", e.g., a TX/RX front end circuit, antenna feed line 136" and horizontal polarization antenna element 106h". Signal processing chain 103''' includes horizontal-polarization element 102''', e.g., a TX/RX front end circuit, antenna feed line 136''' and horizontal polarization antenna element 106h'''. Signal processing chain 103'''' includes horizontal-polarization element 102'''', e.g., a TX/RX front end circuit, antenna feed line 136'''' and horizontal polarization antenna element 106h''''. Signal processing chain 105' includes vertical-polarization element 104', e.g., a TX/RX front end circuit, antenna feed line 176' and vertical polarization antenna element 106v'. Signal processing chain 105" includes vertical-polarization element 104", e.g., a TX/RX front end circuit, antenna feed line 176" and vertical polarization antenna element 106v". Signal processing chain 105''' includes vertical-polarization element 105''', e.g., a TX/RX front end circuit, antenna feed line 176''' and vertical polarization antenna element 106v'''. Signal processing chain 105'''' includes vertical-polarization element 104'''', e.g., a TX/RX front end circuit, antenna feed line 176'''' and vertical polarization antenna element 106v''''.

Each of the horizontal polarization signal processing chains (103', 103'', 103''', 103'''') includes a gain element (118', 118'', 118''', 118'''') and a phase shift element (120', 120'', 120''', 120''''), respectively. Digital beam tables (116', 116'', 116''', 116'''') correspond to signal processing chains (103', 103'', 103''', 103''''), respectively.

Each of the vertical polarization signal processing chains (105', 105'', 105''', 105'''') includes a gain element (158', 158'', 158''', 158'''') and a phase shift element (160', 160'', 160''', 160''''), respectively. Digital beam tables (156', 156'', 156''', 156'''') correspond to signal processing chains (105', 105'', 105''', 105''''), respectively.

Figure 3:
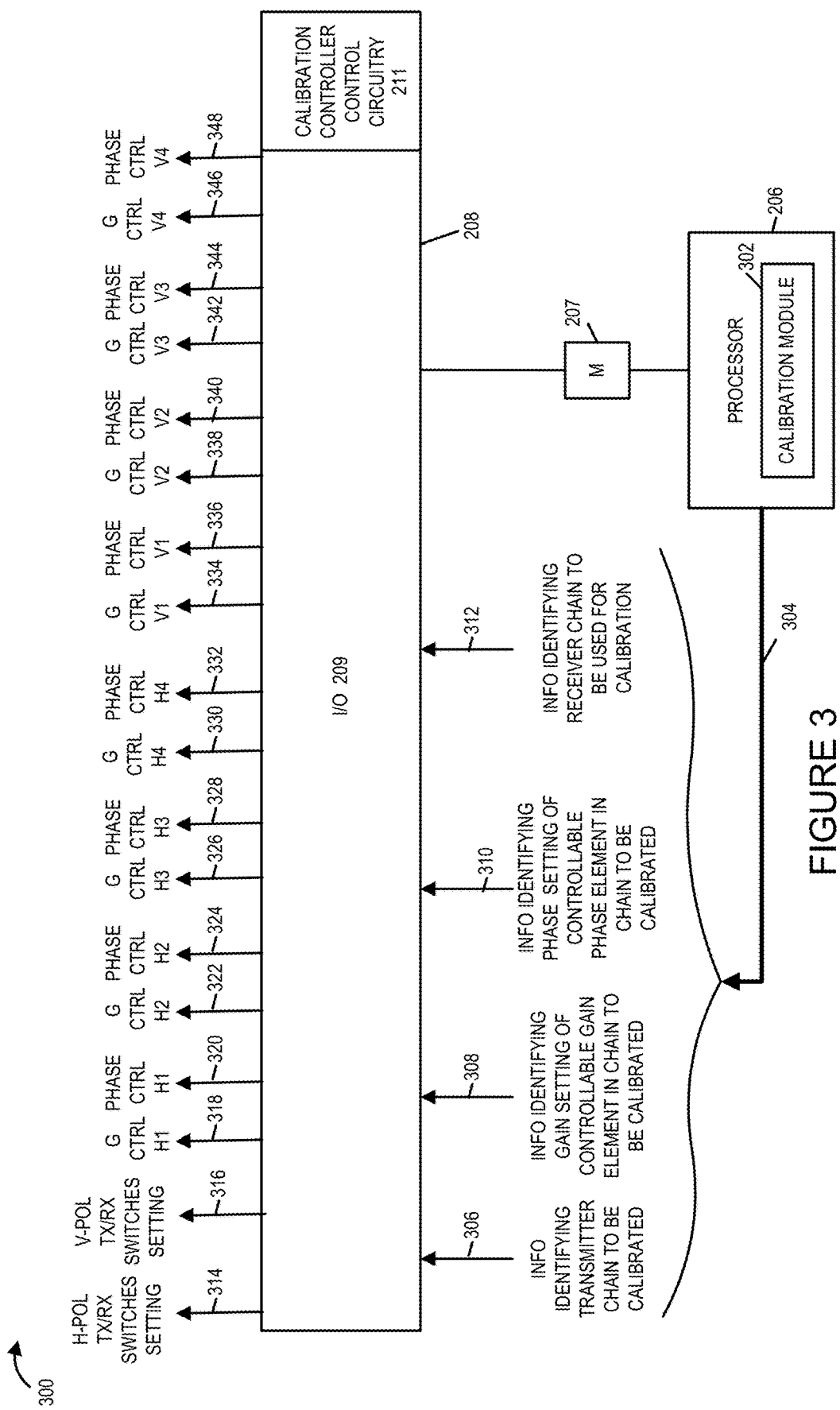
FIG. 3 is a drawing illustrating an exemplary controller that can be used in the system of FIG. 2 or any of the other systems shown in the present application.

FIG. 3 illustrates and exemplary controller assembly 300 which can be, and sometimes is used as the controller 205 shown in various other figures in the present application. Exemplary controller 300 includes processor 206 coupled to a controller 208, in accordance with an exemplary embodiment. The exemplary processor 206 includes a calibration module 302, circuitry or microcode, e.g., which generates signals 304 and controls the controller 208 to perform a series of calibration operations used to calibrate gain and phase for each of front ends. FIG. 3 further shows various exemplary signals/information (information 306 identifying the transmitter chain to be calibrated, information 308 identifying the gain setting of the controllable gain element in the chain to be calibrated, information 310 identifying the phase setting of the controllable phase element in the chain to be calibrated, information 312 identifying the receiver chain to be used for calibration) communicated between the processor 206 and the controller 208, via the controller's I/O interface 209 along with exemplary signals (314, 316, 318, 320, 322, 324, 326, 328, 330, 332, 334, 336, 338, 340, 342, 344, 346, 348) generated by the controller 208, in response to a received set of information (306, 308, 310, 312) and sent to the TX'RX front ends of H-Pol circuit board 202 and V-Pol circuit board 204, e.g., as part of the calibration process. The memory 207 which stores various signal values, error determination results, amplitude and/or phase adjustment values, etc. is also shown. Controller 208 is also shown as including calibration controller circuitry 211 which controls the reception, generation and/or transmission of the various exemplary signals alone or under control of the processor 206. Under control of the processor 206 and/or calibration controller circuitry 211 the components of the system in which the controller 300 is included, e.g., in the form of controller 205, are controlled to implement the steps of one or more methods of the present invention. Thus under control of processor 206 the components in the system may implement the method shown in FIGS. 10, 12 or any of the other figures showing the steps of a method in the present application.

H-Pol TX/RX switches setting signal 314 controls the settings of T/R switches 226 and 232 on H-pol circuit board 202. V-Pol TX/RX switches setting signal 316 controls the settings of T/R switches 266 and 272 on V-pol circuit board 204. Gain control (G ctrl) H1 signal 318 controls the setting of the controllable gain element in H1 front end 102'. Phase control H1 signal 320 controls the setting of the controllable phase element in H1 front end 102'. Gain control (G ctrl) H2 signal 322 controls the setting of the controllable gain element in H2 front end 102''. Phase control H2 signal 324 controls the setting of the controllable phase element in H1 front end 102''. Gain control (G ctrl) H3 signal 326 controls the setting of the controllable gain element in H3 front end 102'''. Phase control H3 signal 328 controls the setting of the controllable phase element in H3 front end 102'''. Gain control (G ctrl) H4 signal 330 controls the setting of the controllable gain element in H4 front end 102''''. Phase control H4 signal 332 controls the setting of the controllable phase element in H4 front end 102''''.

Gain control (G ctrl) V1 signal 334 controls the setting of the controllable gain element in V1 front end 104'. Phase control V1 signal 336 controls the setting of the controllable phase element in V1 front end 104'. Gain control (G ctrl) V2 signal 338 controls the setting of the controllable gain element in V2 front end 104''. Phase control V2 signal 340 controls the setting of the controllable phase element in V1 front end 104''. Gain control (G ctrl) V3 signal 342 controls the setting of the controllable gain element in V3 front end 104'''. Phase control V3 signal 344 controls the setting of the controllable phase element in V3 front end 104'''. Gain control (G ctrl) V4 signal 346 controls the setting of the controllable gain element in V4 front end 104''''. Phase control V4 signal 348 controls the setting of the controllable phase element in V4 front end 104''''.

Figure 4:
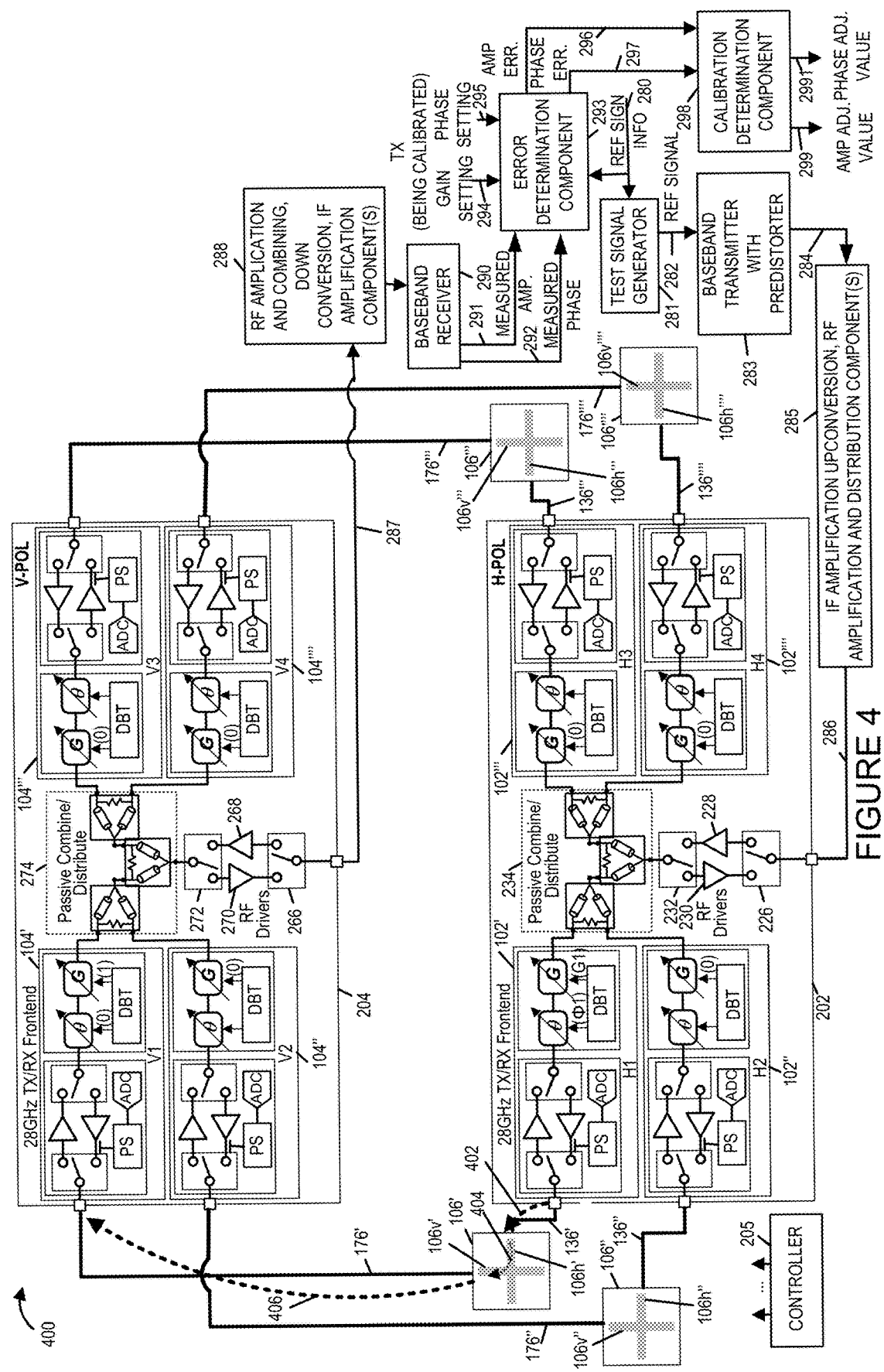
FIG. 4 is a drawing illustrating the system of FIG. 2 for an example of a first gain/phase pair calibration for horizontal polarization front end H1 using vertical polarization front end V1 as the receiver.

FIG. 4 is a drawing 400 illustrating the system of FIG. 2 for an example of a first gain/phase pair calibration for horizontal polarization front end H1 102' using vertical polarization front end V1 104' as the receiver. In this example, the switches 232 and 234 of H-Pol circuit board 202 and the T/R switches of the front ends (H1 102', H2 102'', H3 102''', H4 102'''') are set, e.g., via calibration controller 208, to transmit mode; the switches 272 and 266 of V-Pol circuit board 204 and T/R switches of the front ends (V1 104', V2 104'', V3 104''', V4 104'''') are set, e.g., via calibration controller 208, to receive mode. In addition, with regard to the H-Pol circuit board 202, the variable controllable gain element of H-Pol frontend H1 102' is set, e.g., via calibration controller 208, to value G1 and the variable controllable phase element of H-Pol frontend H1 102' is set, e.g., via calibration controller 208, a value of Φ1; the variable controllable gain element of H-Pol frontend H2 102'' is set, e.g., via calibration controller 208, to 0; the variable controllable gain element of H-Pol frontend H3 102''' is set, e.g., via calibration controller 208, to 0; and the variable controllable gain element of H-Pol frontend H4 102'''' is set, e.g., via calibration controller 208, to 0. In addition, with regard to the V-Pol circuit board 204, the variable controllable gain element of V-Pol frontend V1 104' is set, e.g., via calibration controller 208, to 1 and the variable controllable phase element of V-Pol frontend V1 104' is set, e.g., via calibration controller 208, a value of 0; the variable controllable gain element of V-Pol frontend V2 104'' is set, e.g., via calibration controller 208, to 0; the variable controllable gain element of V-Pol frontend V3 104''' is set, e.g., via calibration controller 208, to 0; and the variable controllable gain element of V-Pol frontend V4 104'''' is set, e.g., via calibration controller 208, to 0.

In the example of FIG. 4, test signal generator 281 uses reference signal information 280 to generate reference signal 282. The baseband transmitter 283 with predistorter generates a baseband signal 284 from the reference signal 282. Component(s) 285 receives baseband signal 284 and generates RF signal 286 which is fed as an input signal to switch 226, of H-Pol circuit board 234. Switch 226, which is set in TX mode, forwards the signal to RF driver 226. Then the output of RF driver 228 is routed through switch 232 (set in TX mode), and thus the signal enters the passive distribute network 234 and is fed an input to each of the front ends (H1

102', H2 102", H3 102''', H4 102''''). However, the gain elements of front ends (H2 102", H3 102''', H4 102'''') have been intentionally set to 0, thus killing the propagation of the signal through those elements. Gain element of front end H1 102' is set to non-zero value G1 and phase element of front end H1 102' is set to value Φ1. Thus the received input signal to H1 102' is subjected to a gain and phase adjustment. The output from the phase element of H1 102' is routed through a T/R switch set to transmit mode, and then the signal is fed to an output amplifier of H1 102', and routed through another T/R switch, set to TX mode, and routed (as indicated by dashed line arrow 402) via antenna feed line 136' to H-Pol antenna element 106h' of antenna 106'. There is coupling between the H-Pol antenna element 106h' of antenna 106' and the V-Pol antenna element 106v' of antenna 106', via which the signal is conveyed, as indicated by dashed line arrow 404. The signal received on V-pol antenna element 106v' is then routed (as indicated by dashed line arrow 406) via antenna feed line 176' to a T/R switch (set to receive mode) of V1 104'. The signal is routed through a receive amplifier, sent through another T/R switch (set to receive mode) and routed through a phase element set to 0 and a gain element set to 1. Then, the output signal from V-pol front end V1 104' enters the passive combine/distribute network 274, is routed through switch 272 (set to receive mode), enters RF driver 270, and is output from T/R switch 266 as signal 287. RF output signal 287, enters component(s) 288 for processing and a baseband signal is output to baseband receiver 290. Baseband receiver 290 measures the received signal generating a measured amplitude value 291 and a measured phase value 292, which are fed as input to the error determination component 293. The error determination component 293, which has also received as input: i) the reference signal information 280, ii) the gain setting for the controllable variable gain element of front end H1 102', which for this example is the value G1, and iii) the phase setting for the controllable variable phase element of front end H1 102', which for this example is the value Φ1, determines an amplitude error 296 and a phase error 297. The calibration determination component 298 determines an amplitude adjustment value 299 and a phase adjustment value 2991 (corresponding to gain/phase setting pair (G1/Φ1), e.g., which are used to adjust the digital beam table of H1 front end 102'.

Figure 5:
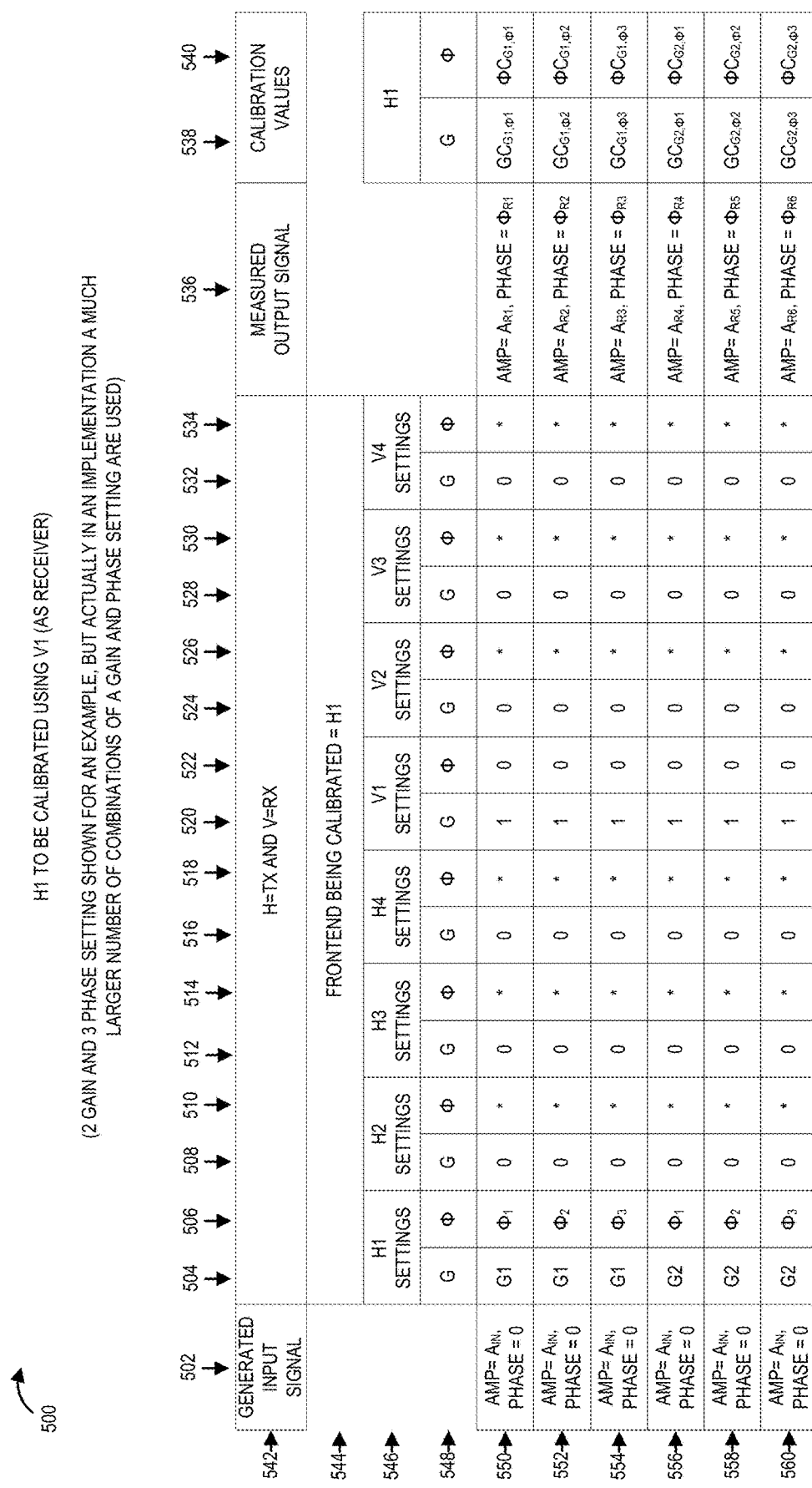
FIG. 5 is a drawing of an exemplary table illustrating exemplary control settings for an example in which horizontal polarization front end H1, operating in TX mode, is to be calibrated with regard to gain and phase adjustments by using vertical polarization front end V1 as the receiver, e.g., in a closed calibration loop, with H1 coupled to V1 via antenna feeds and antenna elements, one horizontal polarization antenna element and one vertical antenna polarization antenna element.

FIG. 5 is a drawing of an exemplary table 500 illustrating exemplary control settings for an example in which horizontal polarization front end H1, operating in TX mode, is to be calibrated (with regard to gain and phase adjustments) using vertical polarization front end V1 as the receiver, e.g., in a closed calibration loop, with H1 coupled to V1 via antenna feeds and antenna elements (a horizontal polarization antenna element and a vertical antenna polarization antenna element). The table 500 of FIG. 5 is shown for a simplified example in which combinations of 2 exemplary gain settings (G1, G2) and 3 exemplary phase settings (Φ1, Φ2, Φ3) are used in the testing; however, in an actual implementation a much larger number of combination of a gain and phase setting are used. In addition in the table of FIG. 5, a single generated test signal is shown to be used. In some implementations, multiple different test signals are used for each combination of a gain and phase setting. For example, in some embodiments, the different test signals may be a set of test signals comprising a constellation.

First column 502 identifies the generated input test signal. In this example, the test signal is a signal with amplitude=AIN and phase=0.

Second through ninth columns identify settings for controlling the controllable variable gain and phase elements of the H-Pol front ends during each test. Second column 504 indicates the gain setting for front end H1. Third column 506 indicates the phase setting for front end H1. Fourth column 508 indicates the gain setting for front end H2. Fifth column 510 indicates the phase setting for front end H2. Sixth column 512 indicates the gain setting for front end H3. Seventh column 514 indicates the phase setting for front end H3. Eighth column 516 indicates the gain setting for front end H4. Ninth column 518 indicates the phase setting for front end H4.

Tenth through seventeenth columns identify settings for controlling the controllable variable gain and phase elements of the V-Pol front ends during each test. Tenth column 520 indicates the gain setting for front end V1. Eleventh column 522 indicates the phase setting for front end V1. Twelfth column 524 indicates the gain setting for front end V2. Thirteenth column 526 indicates the phase setting for front end V2. Fourteenth column 528 indicates the gain setting for front end V4. Fifteenth column 530 indicates the phase setting for front end V3. Sixteenth column 532 indicates the gain setting for front end V4. Seventeenth column 534 indicates the phase setting for front end V4.

Eighteenth column 536 identifies the measured output signal for each test. Nineteenth column 538 identifies the obtained H1 gain calibration value corresponding to each test. Twentieth column 540 identifies the obtained H1 phase calibration value corresponding to each test.

First row 542, second row 544 third row 546 and fourth row 548 include column(s) header information. Fifth row 550 includes information (input signal, control settings, test results) corresponding to testing front end H1 (while operating as a transmitter) using the gain/phase setting combination of G1/Φ1. Sixth row 552 includes information (input signal, control settings, test results) corresponding to testing front end H1 (while operating as a transmitter) using the gain/phase setting combination of G1/Φ2. Seventh row 554 includes information (input signal, control settings, test results) corresponding to testing front end H1 (while operating as a transmitter) using the gain/phase setting combination of G1/Φ3. Eighth row 556 includes information (input signal, control settings, test results) corresponding to testing front end H1 (while operating as a transmitter) using the gain/phase setting combination of G2/Φ1. Ninth row 558 includes information (input signal, control settings, test results) corresponding to testing front end H1 (while operating as a transmitter) using the gain/phase setting combination of G2/Φ2. Tenth row 560 includes information (input signal, control settings, test results) corresponding to testing front end H1 (while operating as a transmitter) using the gain/phase setting combination of G2/Φ3. It should be appreciated that front ends H2, H3, H4, V2, V3, and V4 has been effectively deactivated (or turned-off) during the test via setting their gain values to 0. In various embodiments, the results of columns 538 and 540 are used to update digital beam tables being used by front end H1.

Figure 6:
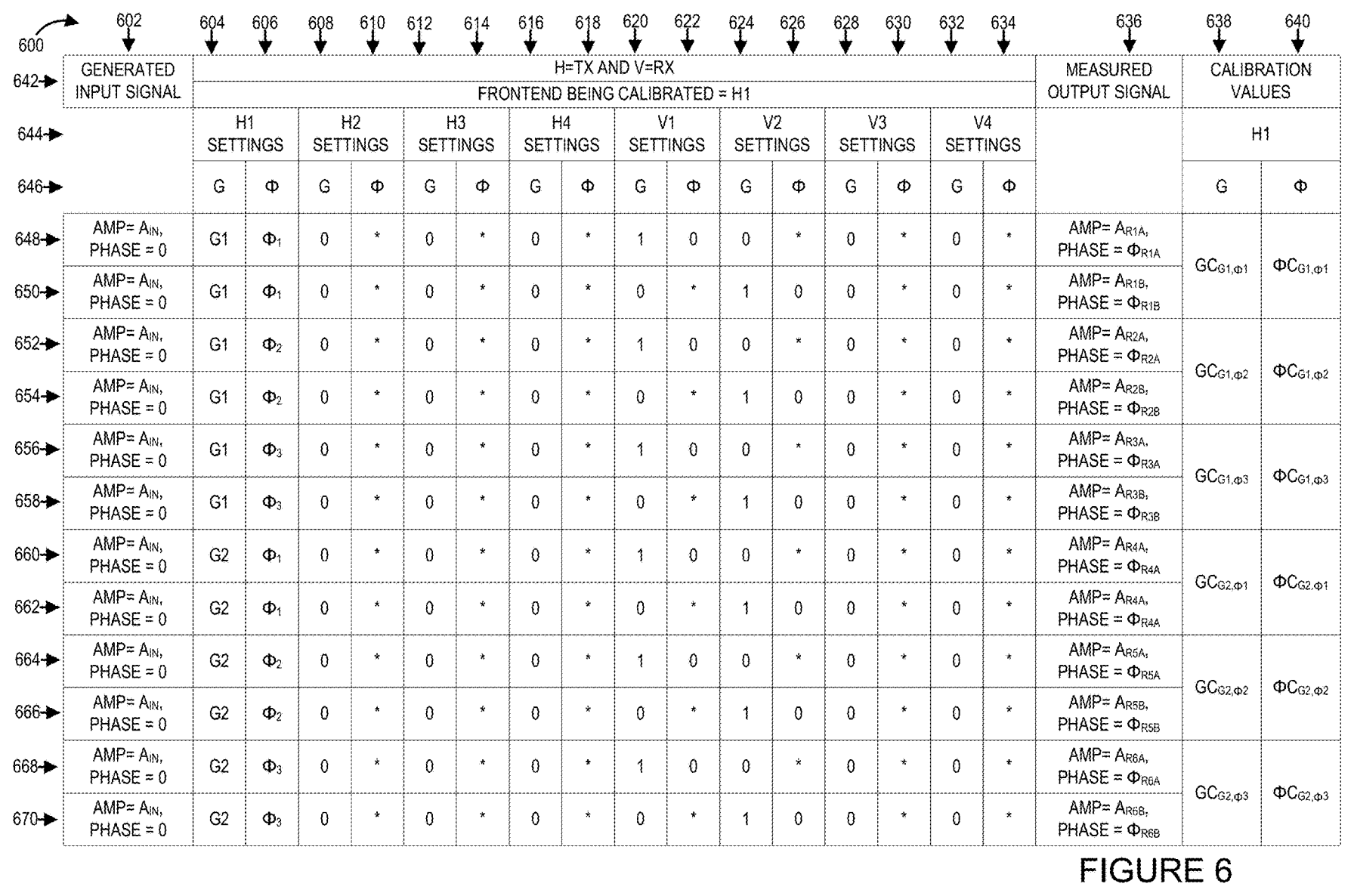

FIG. 6 is a drawing of an exemplary table 600 illustrating exemplary control settings for an example in which horizontal polarization front end H1, operating in TX mode, is to be calibrated (with regard to gain and phase adjustments) using vertical polarization front end V1 as the receiver, e.g., in a closed calibration loop, with H1 coupled to V1 via antenna feeds and antenna elements (a horizontal polarization antenna element and a vertical antenna polarization antenna element) and using vertical polarization front end V2 as the receiver, e.g., in a closed calibration loop, with H1 coupled to V2 via antenna feeds and antenna elements (a horizontal polarization antenna element and a vertical antenna polarization antenna element). The table 600 of FIG. 6 is shown for a simplified example in which combinations of 2 exemplary gain settings (G1, G2) and 3 exemplary phase settings ($\Phi 1$, $\Phi 2$, $\Phi 3$) are used in the testing; however, in an actual implementation a much larger number of combination of a gain and phase setting are used. In addition in the table of FIG. 6, a single generated test signal is shown to be used. In some implementations, multiple different test signals are used for each combination of a gain and phase setting. For example, in some embodiments, the different test signals may be a set of test signals comprising a constellation.

First column 602 identifies the generated input test signal. In this example, the test signal is a signal with amplitude=AIN and phase=0.

Second through ninth columns identify settings for controlling the controllable variable gain and phase elements of the H-Pol front ends during each test. Second column 604 indicates the gain setting for front end H1. Third column 606 indicates the phase setting for front end H1. Fourth column 608 indicates the gain setting for front end H2. Fifth column 610 indicates the phase setting for front end H2. Sixth column 612 indicates the gain setting for front end H3. Seventh column 614 indicates the phase setting for front end H3. Eighth column 616 indicates the gain setting for front end H4. Ninth column 618 indicates the phase setting for front end H4.

Tenth through seventeenth columns identify settings for controlling the controllable variable gain and phase elements of the V-Pol front ends during each test. Tenth column 620 indicates the gain setting for front end V1. Eleventh column 622 indicates the phase setting for front end V1. Twelfth column 624 indicates the gain setting for front end V2. Thirteenth column 626 indicates the phase setting for front end V2. Fourteenth column 628 indicates the gain setting for front end V4. Fifteenth column 630 indicates the phase setting for front end V3. Sixteenth column 632 indicates the gain setting for front end V4. Seventeenth column 634 indicates the phase setting for front end V4.

Eighteenth column 636 identifies the measured output signal for each test. Nineteenth column 638 identifies the obtained H1 gain calibration value corresponding to a pair of tests (a first test in the pair using V1 as the receiver and a second test in the pair using V2 as the receiver). Twentieth column 640 identifies the obtained H1 phase calibration value corresponding to a pair of tests (a first test in the pair using V1 as the receiver and a second test in the pair using V2 as the receiver).

First row 642, second row 644 and third row 646 include column(s) header information. Fourth row 648 includes information (input signal, control settings, test results) corresponding to testing front end H1 (while operating as a transmitter) using the gain/phase setting combination of G1/$\Phi$1 and while using front end V1 as the receiver. Fifth row 650 includes information (input signal, control settings, test results) corresponding to testing front end H1 (while operating as a transmitter) using the gain/phase setting combination of G1/$\Phi$1 and while using front end V2 as the receiver.

Sixth row 652 includes information (input signal, control settings, test results) corresponding to testing front end H1 (while operating as a transmitter) using the gain/phase setting combination of G1/$\Phi$2 and while using front end V1 as the receiver. Seventh row 654 includes information (input signal, control settings, test results) corresponding to testing front end H1 (while operating as a transmitter) using the gain/phase setting combination of G1/$\Phi$2 and while using front end V2 as the receiver.

Eighth row 656 includes information (input signal, control settings, test results) corresponding to testing front end H1 (while operating as a transmitter) using the gain/phase setting combination of G1/$\Phi$3 and while using front end V1 as the receiver. Ninth row 658 includes information (input signal, control settings, test results) corresponding to testing front end H1 (while operating as a transmitter) using the gain/phase setting combination of G1/$\Phi$3 and while using front end V2 as the receiver.

Tenth row 660 includes information (input signal, control settings, test results) corresponding to testing front end H1 (while operating as a transmitter) using the gain/phase setting combination of G2/$\Phi$1 and while using front end V1 as the receiver. Eleventh row 662 includes information (input signal, control settings, test results) corresponding to testing front end H1 (while operating as a transmitter) using the gain/phase setting combination of G2/$\Phi$1 and while using front end V2 as the receiver.

Twelfth row 664 includes information (input signal, control settings, test results) corresponding to testing front end H1 (while operating as a transmitter) using the gain/phase setting combination of G2/$\Phi$2 and while using front end V1 as the receiver. Thirteenth row 666 includes information (input signal, control settings, test results) corresponding to testing front end H1 (while operating as a transmitter) using the gain/phase setting combination of G2/$\Phi$2 and while using front end V2 as the receiver.

Fourteenth row 668 includes information (input signal, control settings, test results) corresponding to testing front end H1 (while operating as a transmitter) using the gain/phase setting combination of G2/$\Phi$3 and while using front end V1 as the receiver. Fifteenth row 670 includes information (input signal, control settings, test results) corresponding to testing front end H1 (while operating as a transmitter) using the gain/phase setting combination of G2/$\Phi$3 and while using front end V2 as the receiver.

It should be appreciated that front ends H2, H3, H4, V3, and V4, and one of V1 or V2 (during each test) has been effectively deactivated (or turned-off) during the test via setting their gain values to 0. In various embodiments, the results of columns 638 and 640 are used to update digital beam tables being used by front end H1.

Figure 7:
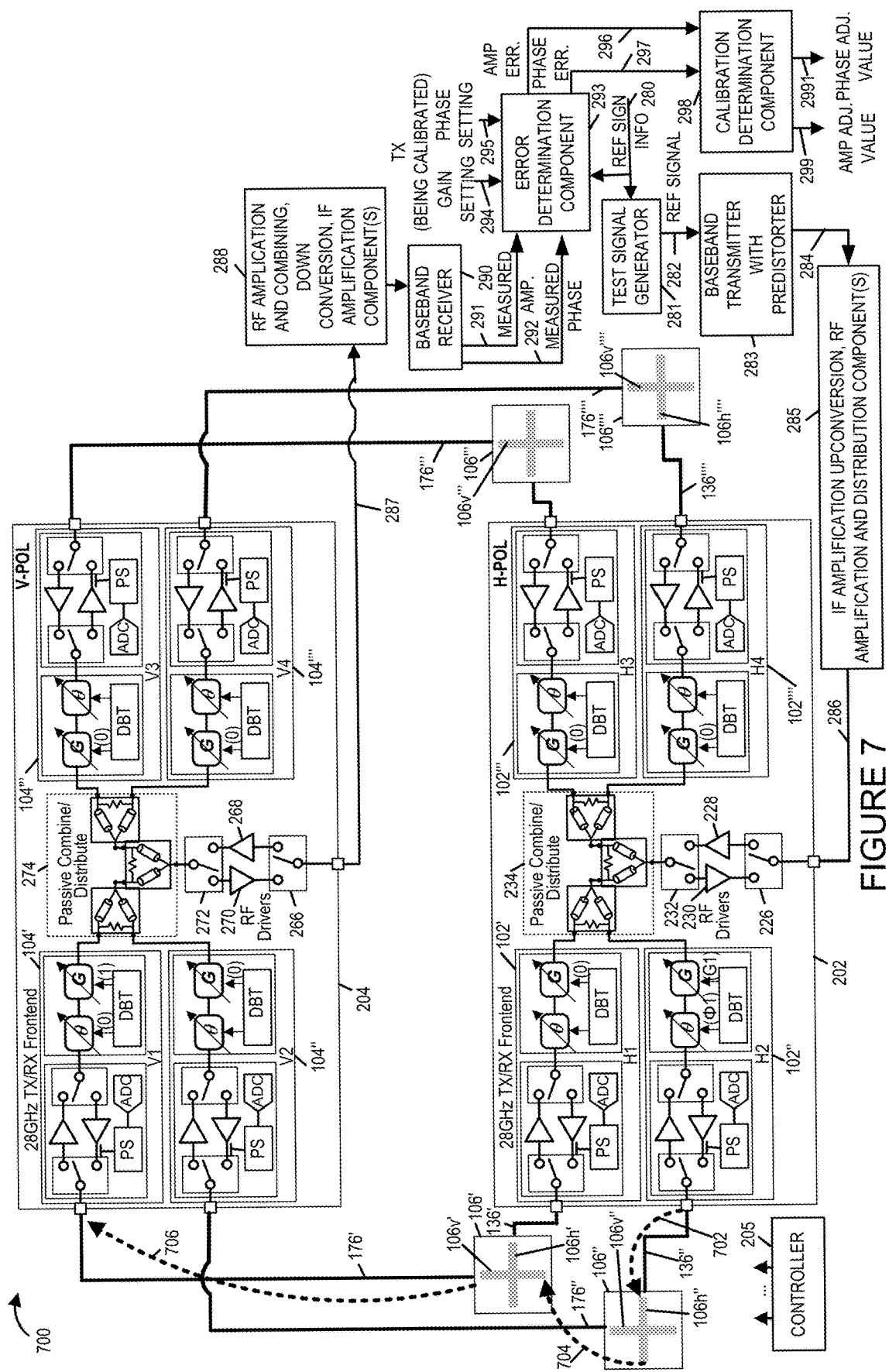
FIG. 7 is a drawing illustrating the system of FIG. 2 for an example of a first gain/phase pair calibration for horizontal polarization front end H2 using vertical polarization front end V1 as the receiver.

FIG. 7 is a drawing 700 illustrating the system of FIG. 2 for an example of a first gain/phase pair calibration for horizontal polarization front end H2 102' using vertical polarization front end V1 104' as the receiver. In this example, the switches 232 and 234 of H-Pol circuit board 202 and the T/R switches of the front ends (H1 102', H2 102", H3 102''', H4 102'''') are set, e.g., via calibration controller 208, to transmit mode; the switches 272 and 266 of V-Pol circuit board 204 and T/R switches of the front ends (V1 104', V2 104", V3 104''', V4 104'''') are set, e.g., via calibration controller 208, to receive mode. In addition, with regard to the H-Pol circuit board 202, the variable controllable gain element of H-Pol frontend H2 102" is set, e.g., via calibration controller 208, to value G1 and the variable controllable phase element of H-Pol frontend H1 102' is set, e.g., via calibration controller 208, a value of $\Phi$1; the variable controllable gain element of H-Pol frontend H1 102' is set, e.g., via calibration controller 208, to 0; the variable controllable gain element of H-Pol frontend H3 102''' is set, e.g., via calibration controller 208, to 0; and the variable controllable gain element of H-Pol frontend H4 102'''' is set, e.g., via calibration controller 208, to 0. In addition, with regard to the V-Pol circuit board 204, the variable controllable gain element of V-Pol frontend V1 104' is set, e.g., via calibration controller 208, to 1 and the variable controllable phase element of V-Pol frontend V1 104' is set, e.g., via calibration controller 208, a value of 0; the variable controllable gain element of V-Pol frontend V2 104" is set, e.g., via calibration controller 208, to 0; the variable controllable gain element of V-Pol frontend V3 104''' is set, e.g., via calibration controller 208, to 0; and the variable controllable gain element of V-Pol frontend V4 104'''' is set, e.g., via calibration controller 208, to 0.

In the example of FIG. 7, test signal generator 281 uses reference signal information 280 to generate reference signal 282. The baseband transmitter 283 with predistorter generates a baseband signal 284 from the reference signal 282. Component(s) 285 receives baseband signal 284 and generates RF signal 286 which is fed as an input signal to switch 226, of H-Pol circuit board 234. Switch 226, which is set in TX mode, forwards the signal to RF driver 226. Then the output of RF driver 228 is routed through switch 232 (set in TX mode), and thus the signal enters the passive distribute network 234 and is fed as input to each of the front ends (H1 102', H2 102", H3 102''', H4 102''''). However, the gain elements of front ends (H1 102', H3 102''', H4 102'''') have been intentionally set to 0, thus killing the propagation of the signal through those elements. Gain element of front end H2 102" is set to non-zero value G1 and phase element of front end H2 102" is set to value Φ1. Thus the received input signal to H2 102" is subjected to a gain and phase adjustment. The output from the phase element of H2 102" is routed through a T/R switch set to transmit mode, and then the signal is fed to an output amplifier of H2 102", and routed through another T/R switch, set to TX mode, and routed (as indicated by dashed line arrow 702) via antenna feed line 136" to H-Pol antenna element 106h" of antenna 106". There is coupling between the H-Pol antenna element 106h" of antenna 106" and the V-Pol antenna element 106v' of antenna 106', via which the signal is conveyed, as indicated by dashed line arrow 704. The signal received on V-pol antenna element 106v' is then routed (as indicated by dashed line arrow 706) via antenna feed line 176' to a T/R switch (set to receive mode) of V1 104'. The signal is routed through a receive amplifier, sent through another T/R switch (set to receive mode) and routed through a phase element set to 0 and a gain element set to 1. Then, the output signal from V-pol front end V1 104' enters the passive combine/distribute network 274, is routed through switch 272 (set to receive mode), enters RF driver 270, and is output from T/R switch 266 as signal 287. RF output signal 287, enters component(s) 288 for processing and a baseband signal is output to baseband receiver 290. Baseband receiver 290 measures the received signal generating a measured amplitude value 291 and a measured phase value 292, which are fed as input to the error determination component 293. The error determination component 293, which has also received as input: i) the reference signal information 280, ii) the gain setting for the controllable variable gain element of front end H2 102", which for this example is the value G1, and iii) the phase setting for the controllable variable phase element of front end H2 102", which for this example is the value Φ1, determines an amplitude error 296 and a phase error 297. The calibration determination component 298 determines an amplitude adjustment value 299 and a phase adjustment value 2991 (corresponding to gain/phase setting pair (G1/Φ1), e.g., which are used to adjust the digital beam table of H2 front end 102".

Figure 8:
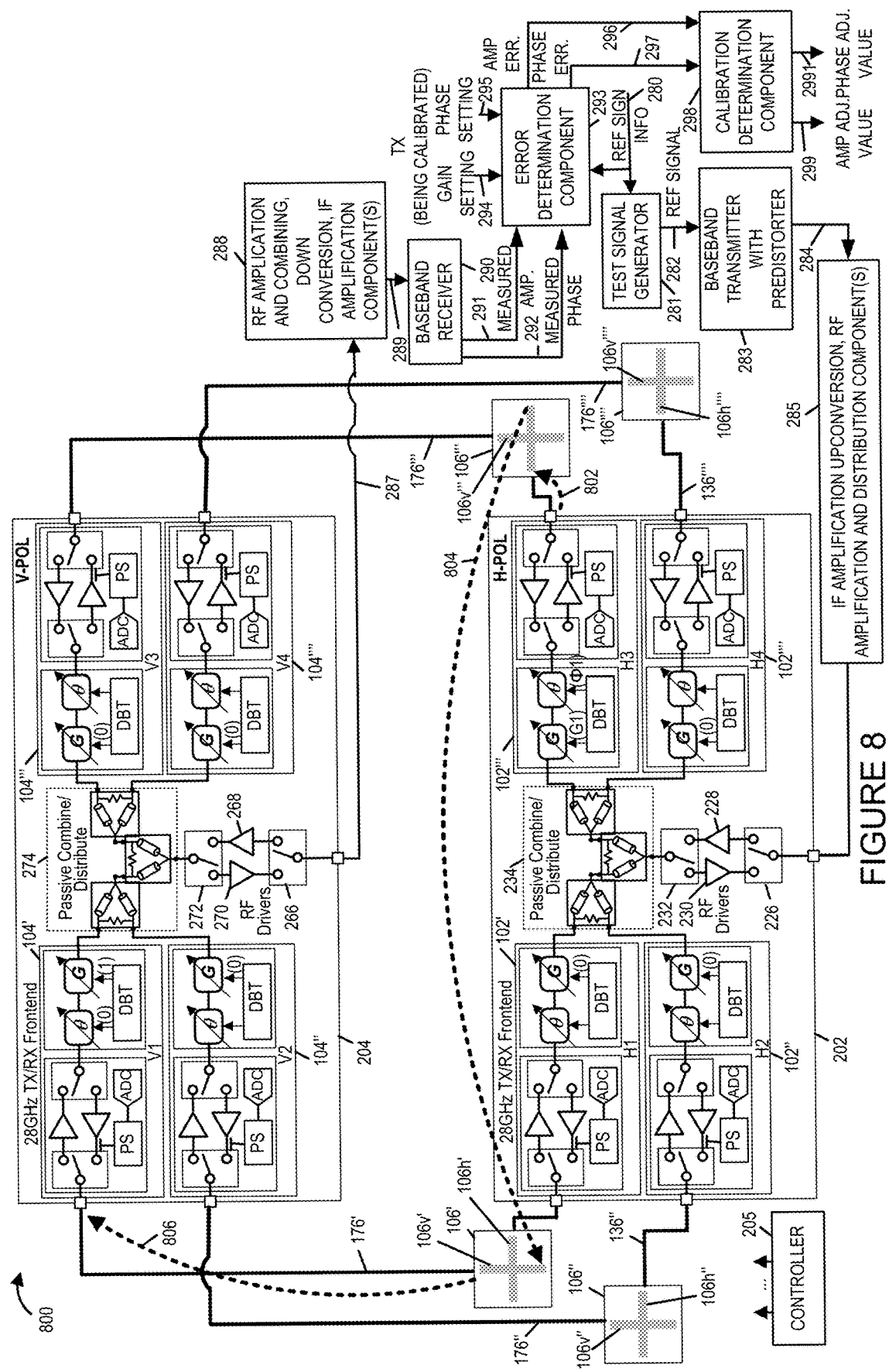
FIG. 8 is a drawing illustrating the system of FIG. 2 for an example of a first gain/phase pair calibration for horizontal polarization front end H3 using vertical polarization front end V1 as the receiver.

FIG. 8 is a drawing 800 illustrating the system of FIG. 2 for an example of a first gain/phase pair calibration for horizontal polarization front end H3 102''' using vertical polarization front end V1 104' as the receiver. In this example, the switches 232 and 234 of H-Pol circuit board 202 and the T/R switches of the front ends (H1 102', H2 102", H3 102''', H4 102'''') are set, e.g., via calibration controller 208, to transmit mode; the switches 272 and 266 of V-Pol circuit board 204 and T/R switches of the front ends (V1 104', V2 104", V3 104''', V4 104'''') are set, e.g., via calibration controller 208, to receive mode. In addition, with regard to the H-Pol circuit board 202, the variable controllable gain element of H-Pol frontend H3 102''' is set, e.g., via calibration controller 208, to value G1 and the variable controllable phase element of H-Pol frontend H3 102''' is set, e.g., via calibration controller 208, a value of Φ1; the variable controllable gain element of H-Pol frontend H1 102' is set, e.g., via calibration controller 208, to 0; the variable controllable gain element of H-Pol frontend H2 102" is set, e.g., via calibration controller 208, to 0; and the variable controllable gain element of H-Pol frontend H4 102'''' is set, e.g., via calibration controller 208, to 0. In addition, with regard to the V-Pol circuit board 204, the variable controllable gain element of V-Pol frontend V1 104' is set, e.g., via calibration controller 208, to 1 and the variable controllable phase element of V-Pol frontend V1 104' is set, e.g., via calibration controller 208, a value of 0; the variable controllable gain element of V-Pol frontend V2 104" is set, e.g., via calibration controller 208, to 0; the variable controllable gain element of V-Pol frontend V3 104''' is set, e.g., via calibration controller 208, to 0; and the variable controllable gain element of V-Pol frontend V4 104'''' is set, e.g., via calibration controller 208, to 0.

In the example of FIG. 8, test signal generator 281 uses reference signal information 280 to generate reference signal 282. The baseband transmitter 283 with predistorter generates a baseband signal 284 from the reference signal 282. Component(s) 285 receives baseband signal 284 and generates RF signal 286 which is fed as an input signal to switch 226, of H-Pol circuit board 234. Switch 226, which is set in TX mode, forwards the signal to RF driver 226. Then the output of RF driver 228 is routed through switch 232 (set in TX mode), and thus the signal enters the passive distribute network 234 and is fed as input to each of the front ends (H1 102', H2 102", H3 102''', H4 102''''). However, the gain elements of front ends (H1 102', H2 102", H4 102'''') have been intentionally set to 0, thus killing the propagation of the signal through those elements. Gain element of front end H3 102''' is set to non-zero value G1 and phase element of front end H3 102''' is set to value Φ1. Thus the received input signal to H3 102''' is subjected to a gain and phase adjustment. The output from the phase element of H3 102''' is routed through a T/R switch set to transmit mode, and then the signal is fed to an output amplifier of H3 102''', and routed through another T/R switch, set to TX mode, and routed (as indicated by dashed line arrow 802) via antenna feed line 136''' to H-Pol antenna element 106h''' of antenna 106'''. There is coupling between the H-Pol antenna element 106h''' of antenna 106''' and the V-Pol antenna element 106v' of antenna 106', via which the signal is conveyed, as indicated by dashed line arrow 804. The signal received on V-pol antenna element 106v' is then routed (as indicated by dashed line arrow 806) via antenna feed line 176' to a T/R switch (set to receive mode) of V1 104'. The signal is routed through a receive amplifier, sent through another T/R switch (set to receive mode) and routed through a phase element set to 0 and a gain element set to 1. Then, the output signal from V-pol front end V1 104' enters the passive combine/distribute network 274, is routed through switch 272 (set to receive mode), enters RF driver 270, and is output from T/R switch 266 as signal 287. RF output signal 287, enters component(s) 288 for processing and a baseband signal is output to baseband receiver 290. Baseband receiver 290 measures the received signal generating a measured amplitude value 291 and a measured phase value 292, which are fed as input to the error determination component 293. The error determination component 293, which has also received as input: i) the reference signal information 280, ii) the gain setting for the controllable variable gain element of front end H3 102''', which for this example is the value G1, and iii) the phase setting for the controllable variable phase element of front end H3 102''', which for this example is the value Φ1, determines an amplitude error 296 and a phase error 297. The calibration determination component 298 determines an amplitude adjustment value 299 and a phase adjustment value 2991 (corresponding to gain/phase setting pair (G1/Φ1), e.g., which are used to adjust the digital beam table of H3 front end 102'''.

Figure 9:
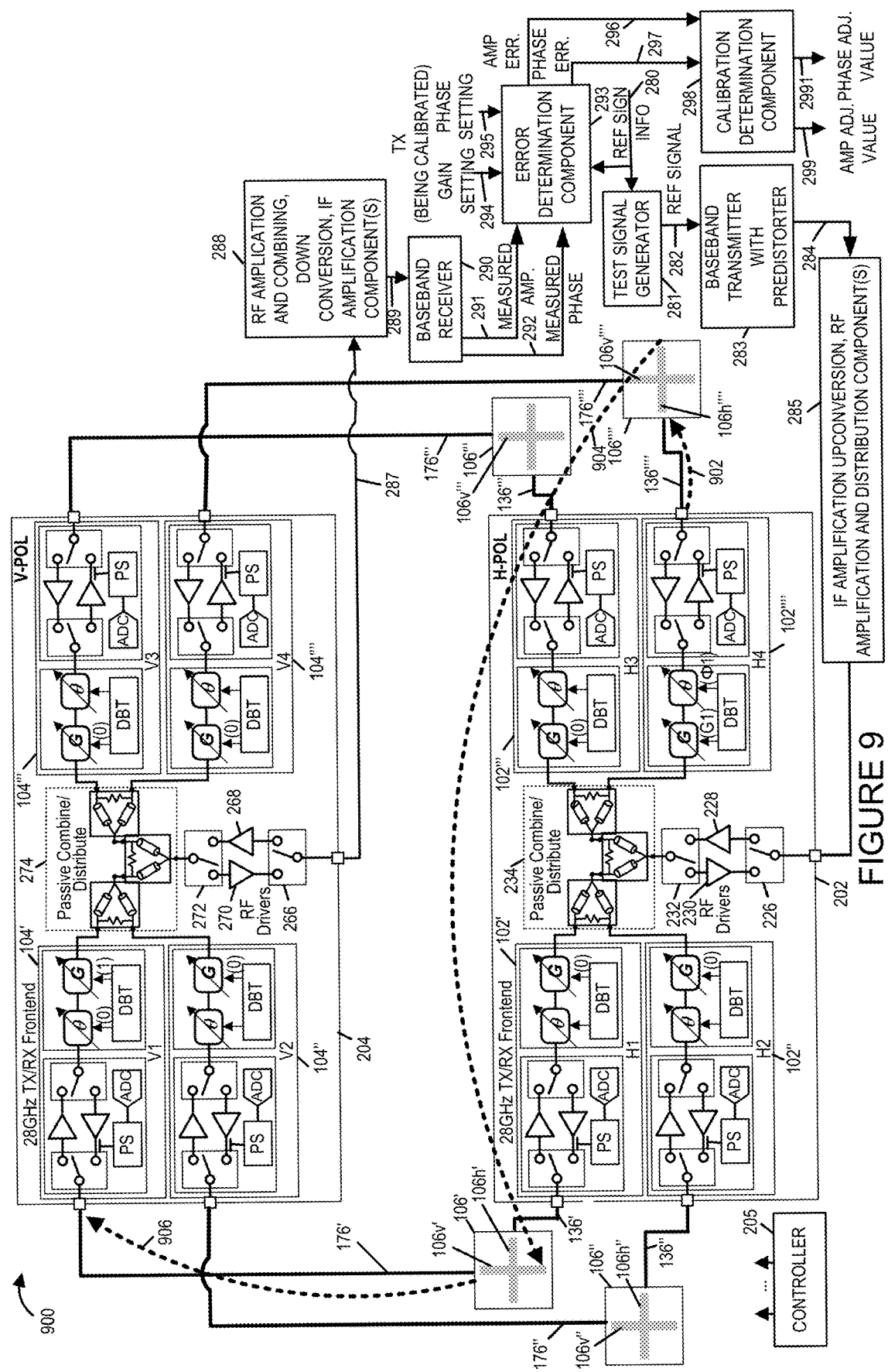
FIG. 9 is a drawing illustrating the system of FIG. 2 for an example of a first gain/phase pair calibration for horizontal polarization front end H4 using vertical polarization front end V1 as the receiver.

FIG. 9 is a drawing 900 illustrating the system of FIG. 2 for an example of a first gain/phase pair calibration for horizontal polarization front end H4 102'''' using vertical polarization front end V1 104' as the receiver. In this example, the switches 232 and 234 of H-Pol circuit board 202 and the T/R switches of the front ends (H1 102', H2 102'', H3 102''', H4 102'''') are set, e.g., via calibration controller 208, to transmit mode; the switches 272 and 266 of V-Pol circuit board 204 and T/R switches of the front ends (V1 104', V2 104'', V3 104''', V4 104'''') are set, e.g., via calibration controller 208, to receive mode. In addition, with regard to the H-Pol circuit board 202, the variable controllable gain element of H-Pol frontend H4 102'''' is set, e.g., via calibration controller 208, to value G1 and the variable controllable phase element of H-Pol frontend H4 102'''' is set, e.g., via calibration controller 208, a value of Φ1; the variable controllable gain element of H-Pol frontend H1 102' is set, e.g., via calibration controller 208, to 0; the variable controllable gain element of H-Pol frontend H2 102'' is set, e.g., via calibration controller 208, to 0; and the variable controllable gain element of H-Pol frontend H3 102' is set, e.g., via calibration controller 208, to 0. In addition, with regard to the V-Pol circuit board 204, the variable controllable gain element of V-Pol frontend V1 104' is set, e.g., via calibration controller 208, to 1 and the variable controllable phase element of V-Pol frontend V1 104' is set, e.g., via calibration controller 208, a value of 0; the variable controllable gain element of V-Pol frontend V2 104'' is set, e.g., via calibration controller 208, to 0; the variable controllable gain element of V-Pol frontend V3 104''' is set, e.g., via calibration controller 208, to 0; and the variable controllable gain element of V-Pol frontend V4 104'''' is set, e.g., via calibration controller 208, to 0.

In the example of FIG. 9, test signal generator 281 uses reference signal information 280 to generate reference signal 282. The baseband transmitter 283 with predistorter generates a baseband signal 284 from the reference signal 282. Component(s) 285 receives baseband signal 284 and generates RF signal 286 which is fed as an input signal to switch 226, of H-Pol circuit board 234. Switch 226, which is set in TX mode, forwards the signal to RF driver 226. Then the output of RF driver 228 is routed through switch 232 (set in TX mode), and thus the signal enters the passive distribute network 234 and is fed as input to each of the front ends (H1 102', H2 102'', H3 102''', H4 102''''). However, the gain elements of front ends (H1 102', H2 102'', H3 102''') have been intentionally set to 0, thus killing the propagation of the signal through those elements. Gain element of front end H4 102'''' is set to non-zero value G1 and phase element of front end H4 102'''' is set to value Φ1. Thus the received input signal to H4 102'''' is subjected to a gain and phase adjustment. The output from the phase element of H4 102'''' is routed through a T/R switch set to transmit mode, and then the signal is fed to an output amplifier of H4 102'''', and routed through another T/R switch, set to TX mode, and routed (as indicated by dashed line arrow 902) via antenna feed line 136'''' to H-Pol antenna element 106h'''' of antenna 106'''. There is coupling between the H-Pol antenna element 106h'''' of antenna 106''' and the V-Pol antenna element 106v' of antenna 106', via which the signal is conveyed, as indicated by dashed line arrow 904. The signal received on V-pol antenna element 106v' is then routed (as indicated by dashed line arrow 906) via antenna feed line 176' to a T/R switch (set to receive mode) of V1 104'. The signal is routed through a receive amplifier, sent through another T/R switch (set to receive mode) and routed through a phase element set to 0 and a gain element set to 1. Then, the output signal from V-pol front end V1 104' enters the passive combine/distribute network 274, is routed through switch 272 (set to receive mode), enters RF driver 270, and is output from T/R switch 266 as signal 287. RF output signal 287, enters component(s) 288 for processing and a baseband signal is output to baseband receiver 290. Baseband receiver 290 measures the received signal generating a measured amplitude value 291 and a measured phase value 292, which are fed as input to the error determination component 293. The error determination component 293, which has also received as input: i) the reference signal information 280, ii) the gain setting for the controllable variable gain element of front end H4 102'''', which for this example is the value G1, and iii) the phase setting for the controllable variable phase element of front end H4 102'''', which for this example is the value Φ1, determines an amplitude error 296 and a phase error 297. The calibration determination component 298 determines an amplitude adjustment value 299 and a phase adjustment value 2991 (corresponding to gain/phase setting pair (G1/Φ1), e.g., which are used to adjust the digital beam table of H4 front end 102''''.

Figure 10A:
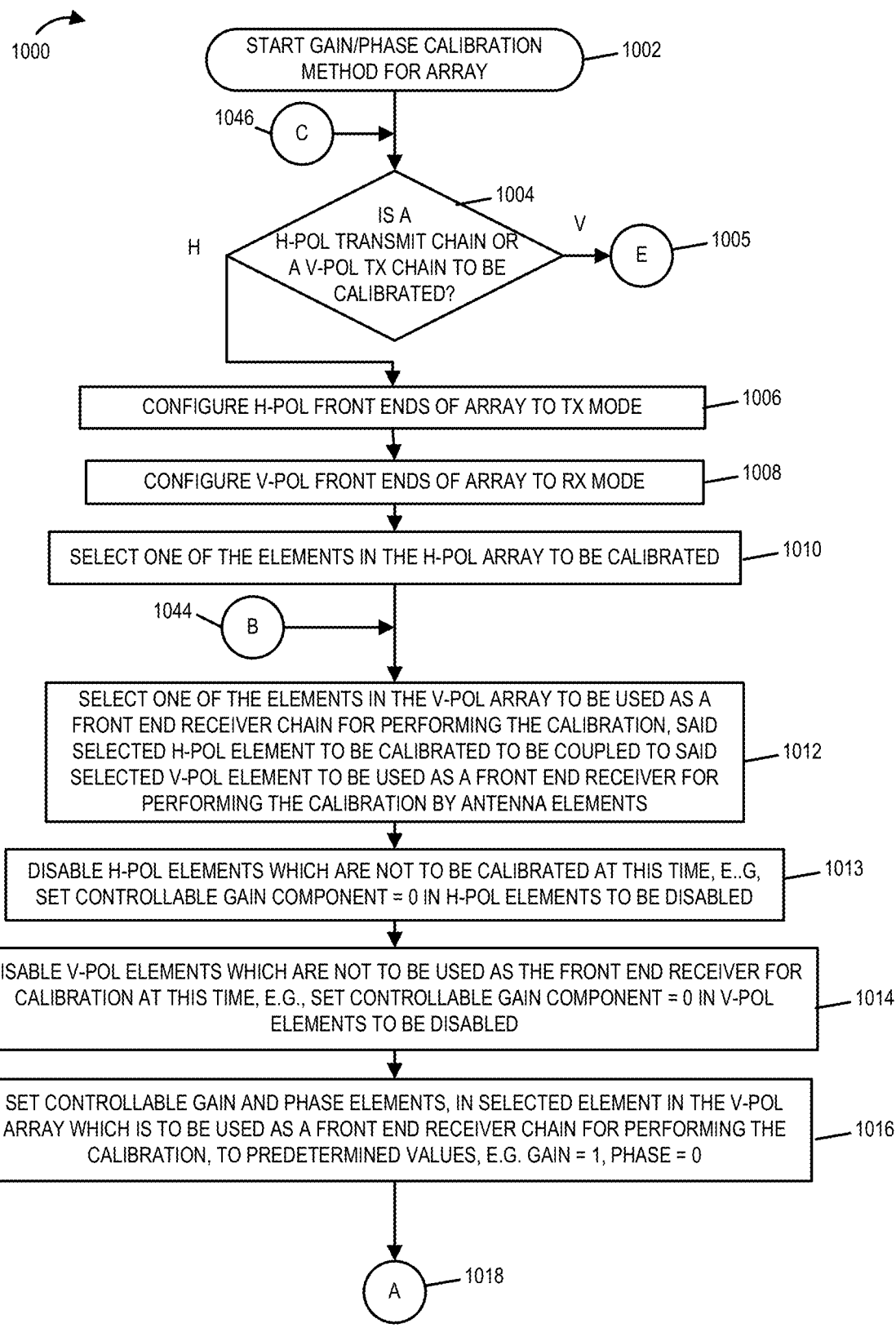
FIG. 10A is a first part of flowchart of an exemplary method of gain/phase calibration for an array, e.g., an array of front ends, in accordance with an exemplary embodiment.
Figure 10B:
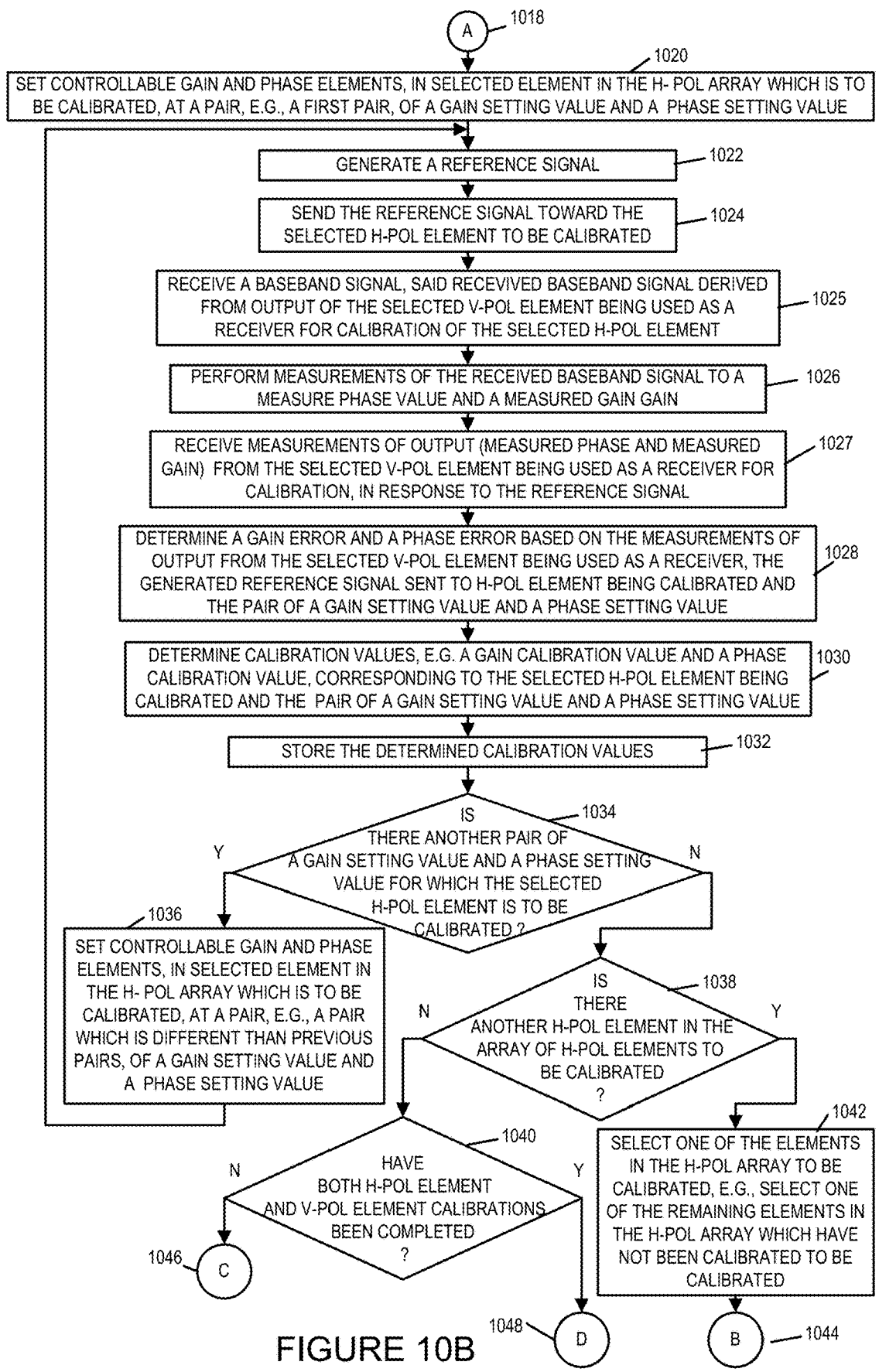
FIG. 10B is a second part of flowchart of an exemplary method of gain/phase calibration for an array, e.g., an array of front ends, in accordance with an exemplary embodiment.
Figure 10C:
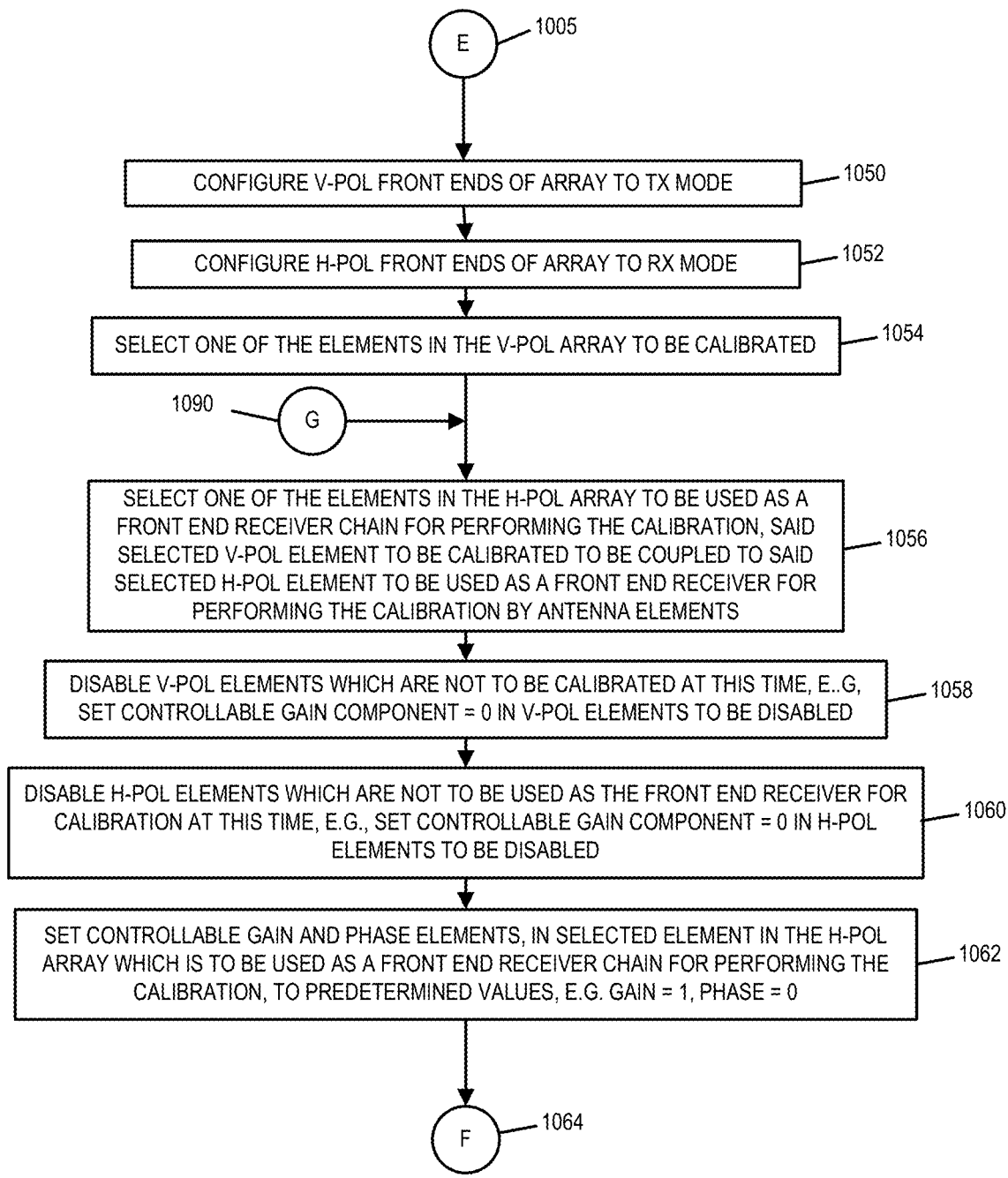
FIG. 10C is a third part of flowchart of an exemplary method of gain/phase calibration for an array, e.g., an array of front ends, in accordance with an exemplary embodiment.
Figure 10D:
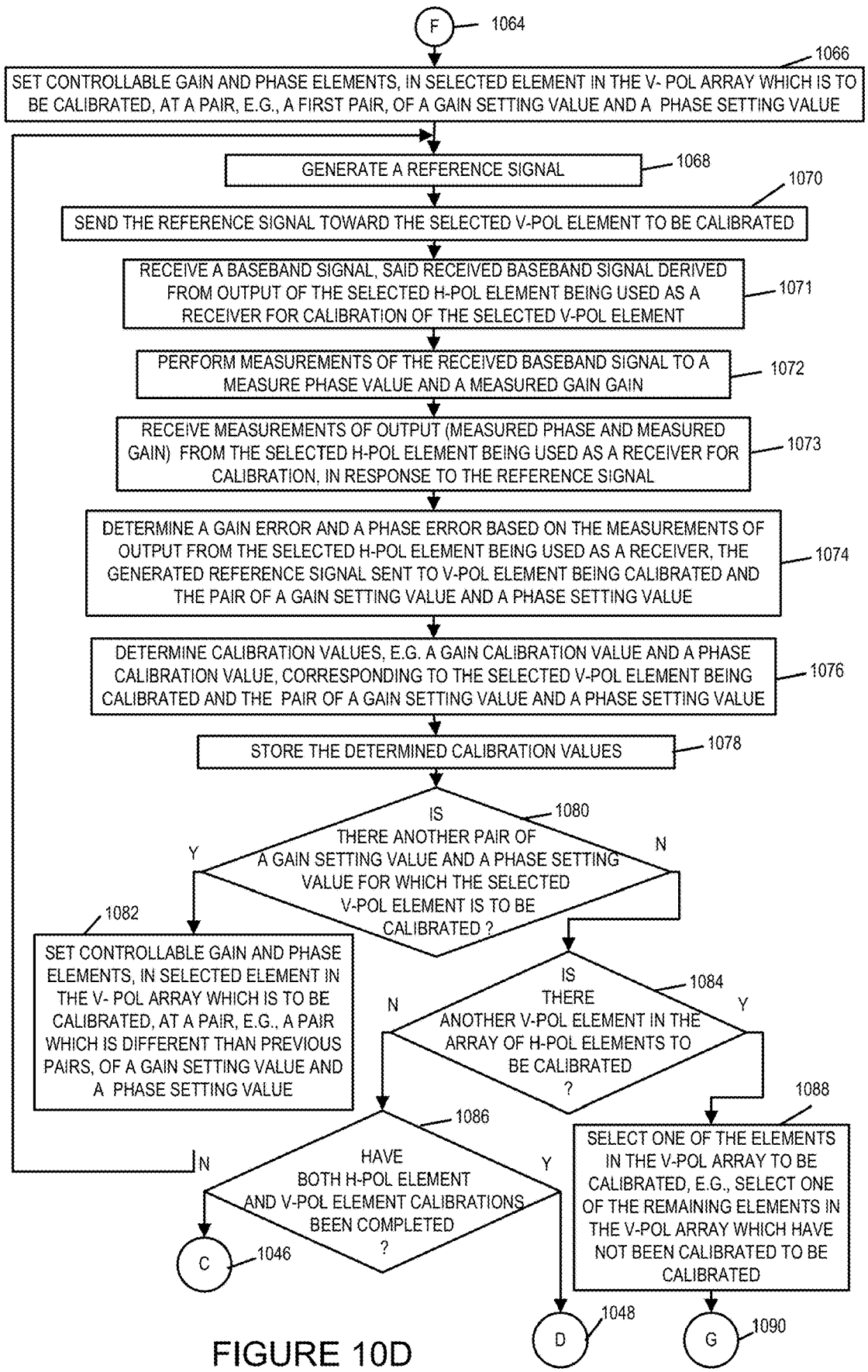
FIG. 10D is a fourth part of flowchart of an exemplary method of gain/phase calibration for an array, e.g., an array of front ends, in accordance with an exemplary embodiment.
Figure 10E:
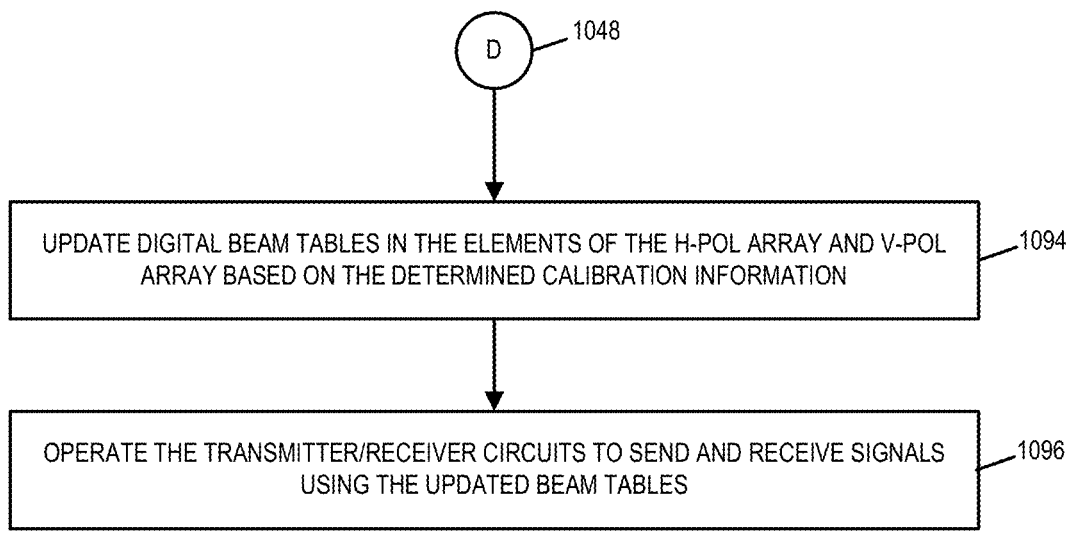
FIG. 10 comprises the combination of FIG. 10A, FIG. 10B, FIG. 10C, FIG. 10D and FIG. 10E.
Figure 10:
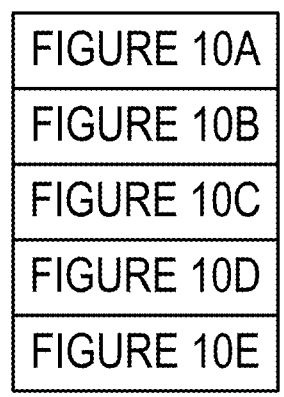

FIG. 10, comprising the combination of FIG. 10A, FIG. 10B, FIG. 10C and FIG. 10D, is a flowchart 1000 of an exemplary method of gain/phase calibration for an array, e.g., an array of TX/RX front ends, in accordance with an exemplary embodiment. Operation starts in step 1002 and proceeds to step 1004.

In step 1004 a determination is made as to whether a horizontal polarization (H-pol) transmit chain or a vertical polarization (V-pol) TX chain is to be calibrated. If the determination of step 1004 is that a H-Pol transmit chain is to be calibrated, then operation proceeds from step 1004 to step 1006. If the determination of step 1004 is that a V-Pol transmit chain is to be calibrated, then operation proceeds from step 1004, via connecting node E 1005 to step 1050.

Returning to step 1006, in step 1006 the H-Pol front ends of the array are configured to TX mode. Operation proceeds from step 1006 to step 1008. In step 1008 the V-Pol front ends of the array are configured to RX mode. Operation proceeds from step 1008 to step 1010. In step 1010 one of the elements in the H-Pol array is selected to be calibrated. Operation proceeds from step 1010 to step 1012. In step 1012 the one of the elements in the V-Pol array is selected to be used a front end receiver chain for performing the calibration, said select H-pol element to be calibrating to be coupled to said selected V-pol element to be used as a front end receiver for performing the calibration by antenna elements. Operation proceeds from step 1012 to step 1013. In step 1013 the H-pol elements which are not to be calibrated at this time are disabled, e.g., the controllable gain element in each H-pol element which is to be disabled is controlled to be set to a value of zero. Operation proceeds from step 1013 to step 1014. In step 1014 the V-pol elements which are not to be used as the front end receiver for calibration at this time are disabled, e.g., the controllable gain element in each V-pol element which is to be disabled is controlled to be set to a value of zero. Operation proceeds from step 1014 to step 1016. In step 1016 the controllable gain and phase elements, in the selected element in the V-pol array which is to be used as a front end receiver chain for performing the calibration, is set to predetermined values, e.g., gain=1 and phase=0. Operation proceeds from step 1016, via connecting node A 1018, to step 1020.

In step 1020 the controllable gain and phase elements, in the selected element in the H-array which is to be calibrated, are set to a pair, e.g. a first pair, of a gain setting value and a phase setting value, e.g., gain value setting=G1 and phase setting value=Φ1. Operation proceeds from step 1020 to step 1022. In step 1022 a reference signal is generated, e.g. test signal generator 281 generates a reference signal. Operation proceeds from step 1022 to step 1024.

In step 1024 the reference signal is sent toward the selected H-pol element, e.g., H1, to be calibrated. For example reference signal 282 is sent, via baseband transmitter with predistorter, IF amplification. upconversion, RF amplification and distribution component(s) 285, switch 226, RF driver 228, switch 232 and passive combine/distribute circuit 234 to H1 frontend 102'. Operation proceeds from step 1024 to step 1026.

In step 1026 measurements of the output (measured phase and measured gain) from the selected V-pol element being used as a receiver for the calibration, e.g., V1 104', are received, e.g., by the error determination component 283, in response to the reference signal. Operation proceeds from step 1026 to step 1028.

In step 1028 the error determination component 293 determines a gain error and a phase error based on the measurements of the output from the selected V-pol element being used as a receiver, the generated reference signal sent to the H-pol element being calibrated, and the pair of a gain setting value and a phase setting value. Operation proceeds from step 1028 to step 1030.

In step 1030 the calibration determination component 298 determines calibrations values, e.g., a gain calibration value and a phase calibration value, corresponding to the selected H-pol element being calibrated and the pair of a gain setting value an a phase setting value. Operation proceeds from step 1030 to step 1032, in which the determined calibration values are stored. Operation proceeds from step 1032 to step 1034.

In step 1034 a determination is made as to whether or not there is another pair of a gain setting value a phase setting value for the H-pol element is to be calibrated. If the determination is that there is another pair of again setting value and a phase setting value for which the selected H-pol element is to be calibrated, then operation proceeds from step 1034 to step 1036; otherwise, operation proceeds from step 1034 to step 1038.

Returning to step 1036, in step 1036 the controllable gain and phase elements in the selected element in the H-pol array which is to be calibrated is set at a pair, e.g., a pair which is different than previous pairs of a gain setting value and a phase setting value, e.g., G1 and Φ2 for a second test. Operation proceeds from step 1036 to the input of step 1022.

Returning to step 1038, in step 1038 a determination is to made as to whether or not there is another H-pol element in the array of H-pol elements to be calibrated. If the determination is that there is another H-pol element in the array of H-pol elements to be calibrated, then operation proceeds from step 1038 to step 1042; otherwise operation proceeds from step 1038 to step 1040.

Returning to step 1042, in step 1042 one of the H-pol elements in the H-pol array is selected to be calibrated, e.g., one of the remaining elements in the H-pol array which have not been calibrated is selected to be calibrated. For example, in the first iteration of step 1042, H2 is selected. Operation proceeds from step 1042, via connecting node B 1044 to the input of step 1012.

Returning to step 1040, in step 1040 a determination is made as to whether or not both H-pol element and V-pol element calibrations have been completed. If both H-pol element and V-pol element calibrations have not been completed, then operation proceeds from step 1040, via connecting node C 1046, to the input of step 1004. If both H-pol element and V-pol element calibrations have been completed, then operation proceeds from step 1040, via connecting node D 1048, to the input of step 1094. In step 1094 the digital beam table in the elements of the H-Pol array and Y-Pol array are updated based on the determined calibration information. Operation proceeds from step 1094 to step 1096. In step 1096 the transmitter/receive circuits are used to send and receive signal using the updated beam table.

Returning to step 1050, in step 1050 the V-Pol front ends of the array are configured to TX mode. Operation proceeds from step 1050 to step 1052. In step 1052 the H-Pol front ends of the array are configured to RX mode. Operation proceeds from step 1052 to step 1054. In step 1054 one of the elements in the V-Pol array is selected to be calibrated. Operation proceeds from step 1054 to step 1056. In step 1056 the one of the elements in the H-Pol array is selected to be used a front end receiver chain for performing the calibration, said selected V-Pol element to be calibrated to be coupled to said selected H-pol element, to be used as a front end receiver for performing the calibration, by antenna elements. Operation proceeds from step 1056 to step 1058. In step 1058 the V-pol elements which are not to be calibrated at this time are disabled, e.g., the controllable gain element in each V-pol element which is to be disabled is controlled to be set to a value of zero. Operation proceeds from step 1058 to step 1060. In step 1060 the H-pol elements which are not to be used as the front end receiver for calibration at this time are disabled, e.g., the controllable gain element in each H-pol element which is to be disabled is controlled to be set to a value of zero. Operation proceeds from step 1060 to step 1062. In step 1062 the controllable gain and phase elements, in the selected element in the H-pol array which is to be used as a front end receiver chain for performing the calibration, is set to predetermined values, e.g., gain=1 and phase=0. Operation proceeds from step 1062, via connecting node F 1064, to step 1066.

In step 1066 the controllable gain and phase elements, in the selected element in the V-array which is to be calibrated, are set to a pair, e.g. a first pair, of a gain setting value and a phase setting value, e.g., gain value setting=G1 and phase setting value=Φ1. Operation proceeds from step 1066 to step 1068. In step 1068 a reference signal is generated, e.g. test signal generator 281 generates a reference signal. Operation proceeds from step 1068 to step 1070.

In step 1070 the reference signal is sent toward the selected V-pol element, e.g., V1, to be calibrated. For example reference signal 282 is sent, via baseband transmitter with predistorter, IF amplification. upconversion, RF amplification and distribution component(s) 285, switch 266, RF driver 268, switch 272 and passive combine/distribute circuit 274 to V1 frontend 104'. Operation proceeds from step 1070 to step 1072.

In step 1072 measurements of the output (measured phase and measured gain) from the selected H-pol element being used as a receiver for the calibration, e.g., H1 1042', are received, e.g., by the error determination component 283, in response to the reference signal. Operation proceeds from step 1072 to step 1074.

In step 1074 the error determination component 293 determines a gain error and a phase error based on the measurements of the output from the selected H-pol element being used as a receiver, the generated reference signal sent to the V-pol element being calibrated, and the pair of a gain setting value and a phase setting value. Operation proceeds from step 1074 to step 1076.

In step 1076 the calibration determination component 298 determines calibrations values, e.g., a gain calibration value and a phase calibration value, corresponding to the selected V-pol element being calibrated and the pair of a gain setting value and a phase setting value. Operation proceeds from step 1076 to step 1078, in which the determined calibration values are stored. Operation proceeds from step 1078 to step 1080.

In step 1080 a determination is made as to whether or not there is another pair of a gain setting value a phase setting value for which the selected V-pol element is to be calibrated. If the determination is that there is another pair of again setting value and a phase setting value for which the selected V-pol element is to be calibrated, then operation proceeds from step 1080 to step 1082; otherwise, operation proceeds from step 1080 to step 1084.

Returning to step 1082, in step 1082 the controllable gain and phase elements in the selected element in the V-pol array which is to be calibrated is set at a pair, e.g., a pair which is different than previous pairs of a gain setting value and a phase setting value, e.g., G1 and Φ2 for a second test. Operation proceeds from step 1082 to the input of step 1068.

Returning to step 1084, in step 1084 a determination is to made as to whether or not there is another V-pol element in the array of V-pol elements to be calibrated. If the determination is that there is another V-pol element in the array of V-pol elements to be calibrated, then operation proceeds from step 1084 to step 1088; otherwise, operation proceeds from step 1084 to step 1086.

Returning to step 1088, in step 1088 one of the V-pol elements in the V-pol array is selected to be calibrated, e.g., one of the remaining elements in the V-pol array which has not been calibrated is selected to be calibrated. For example, in the first iteration of step 1088, V2 is selected. Operation proceeds from step 1088, via connecting node G 1090 to the input of step 1056.

Returning to step 1086, in step 1086 a determination is made as to whether or not both H-pol element and V-pol element calibrations have been completed. If both H-pol element and V-pol element calibrations have not been completed, then operation proceeds from step 1086, via connecting node C 1046, to the input of step 1004. If both H-pol element and V-pol element calibrations have been completed, then operation proceeds from step 1086, via connecting node D 1048, to the input of step 1094. In step 1094 the digital beam table in the elements of the H-Pol array and Y-Pol array are updated based on the determined calibration information. Operation proceeds from step 1094 to step 1096. In step 1096 the transmitter/receive circuits are used to send and receive signal using the updated beam table.

Figure 11:
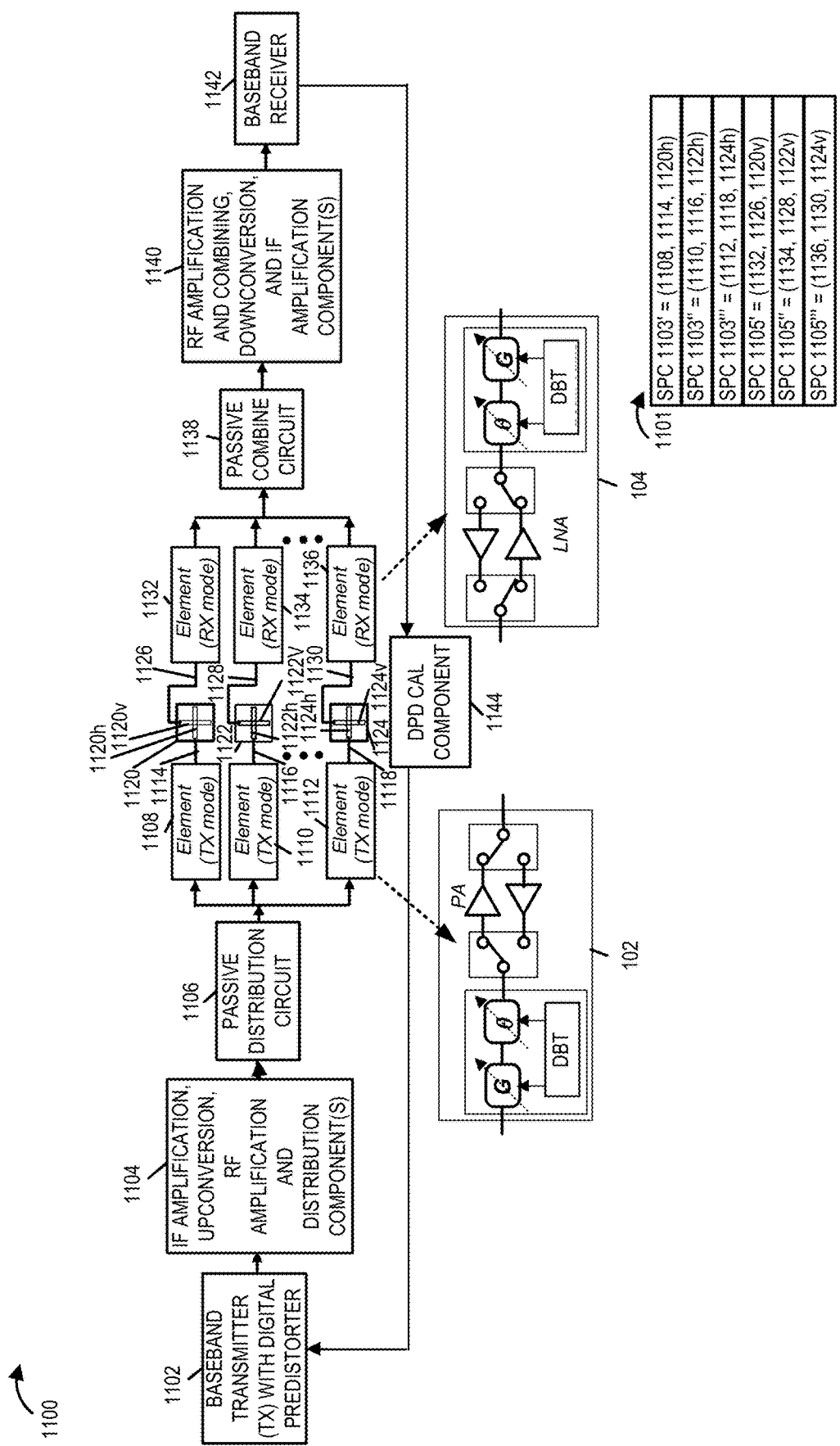
FIG. 11 is a drawing of an exemplary system supporting digital predistortion calibration (SPD) for arrays of front-end elements in accordance with an exemplary embodiment.

FIG. 11 is a drawing of an exemplary system 1100 supporting digital pre-distortion calibration (DPD) for arrays of front-end elements in accordance with an exemplary embodiment. Exemplary system 1100 includes a baseband transmitter (TX) 1102 including a digital predistorter 1102, an intermediate frequency (IF) amplifier, upconverter, RF amplifier, and distribution component(s) 1104, a passive distribution circuit 1106, a plurality of TX/RX front end elements, which are set to transmit mode, (element 1 1108, element 2 1110, . . . , element n 1112), a plurality of antenna leads (antenna lead 1 1114, antenna lead 1116, . . . , antenna lead n 1118), a plurality of antenna (antenna 1 1120 including a horizontal polarization antenna element 1120h and a vertical polarization antenna element 1120v, antenna 2 1122 including a horizontal polarization antenna element 1122h and a vertical polarization antenna element 1122v, . . . , antenna n 1124 including a horizontal polarization antenna element 1124h and a vertical polarization antenna element 1124v, a plurality of antenna leads (antenna lead 1' 1126, antenna lead 2' 1128, . . . , antenna lead n' 1130), a plurality of TX/RX front end elements, which are set to receive mode, (element 1' 1132, element 2' 1134, . . . , element n' 1136), a passive combine circuit 1138, an RF amplification and combining, downconversion and IF amplification component(s) 1142, a baseband receiver 1142, and a digital predistortion (DPD) component 1144 coupled together as shown. It should be appreciated that there is coupling between horizontal polarization antenna elements (1120h, 1122h, . . . , 1124h) and the vertical polarization antenna elements (1120v, 1122v, . . . , 1124v), which is made use of as part of the method of calibrating predistortion coefficients.

Each of the elements (1108, 1110, . . . , 1112) in transmit (TX) mode may be represented by exemplary TX/RX frontend element 102 of FIG. 1. Each of the elements (1132, 1134, . . . , 1136) in receive mode may be represented by exemplary TX/RX frontend element 104 of FIG. 1.

As shown in FIG. 11, the loopback from the TX to the RX can be, and sometimes is, used to detect the TX signal so that predistortion coefficients for the transmitter can be determined, e.g., by DPD calibration component 1144.

FIG. 11 further includes legend 1101, which identifies components of the signal processing chains shown in FIG. 11. Signal processing chain 1103' includes horizontal-polarization element 1108, e.g., a TX/RX front end circuit, antenna feed line 1114 and horizontal polarization antenna element 1120h. Signal processing chain 1103" includes horizontal-polarization element 1110, e.g., a TX/RX front end circuit, antenna feed line 1116 and horizontal polarization antenna element 1122h. Signal processing chain 1103''' includes horizontal-polarization element 1112, e.g., a TX/RX front end circuit, antenna feed line 1118 and horizontal polarization antenna element 1124h. Signal processing chain 1105' includes vertical-polarization element 1132, e.g., a TX/RX front end circuit, antenna feed line 1126 and vertical polarization antenna element 1120v. Signal processing chain 1105" includes vertical-polarization element 1134, e.g., a TX/RX front end circuit, antenna feed line 1128 and vertical polarization antenna element 1122v. Signal processing chain 1105''' includes vertical-polarization element 1136, e.g., a TX/RX front end circuit, antenna feed line 1130 and vertical polarization antenna element 1124v.

In some embodiments system 1100 includes device 200, e.g., with signal processing chains (1103', 1103", 1103''') of FIG. 11 being, e.g., signal processing chains (103', 103", 103'''') of FIG. 2, and with signal processing chains (1105', 1105", 1105''') of FIG. 11 being, e.g., signal processing chains (105', 105", 105'''') of FIG. 2.

Figure 12A:
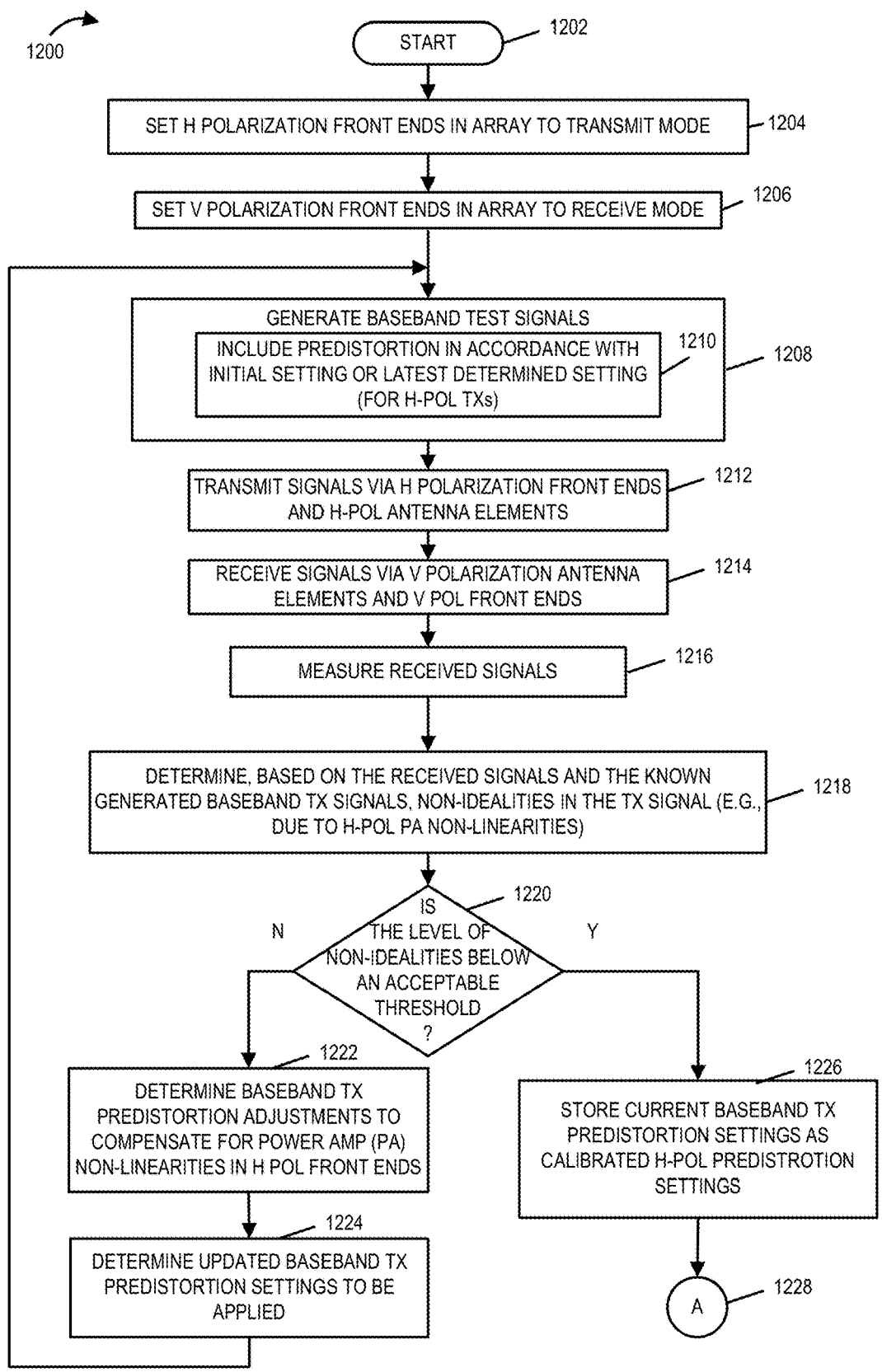
FIG. 12A is a first part of a flowchart of an exemplary method of performing calibration to determine pre-distortion calibration coefficients and using the determined pre-distortion calibration coefficients in accordance with an exemplary embodiment.
Figures 12, 12A, 12B:
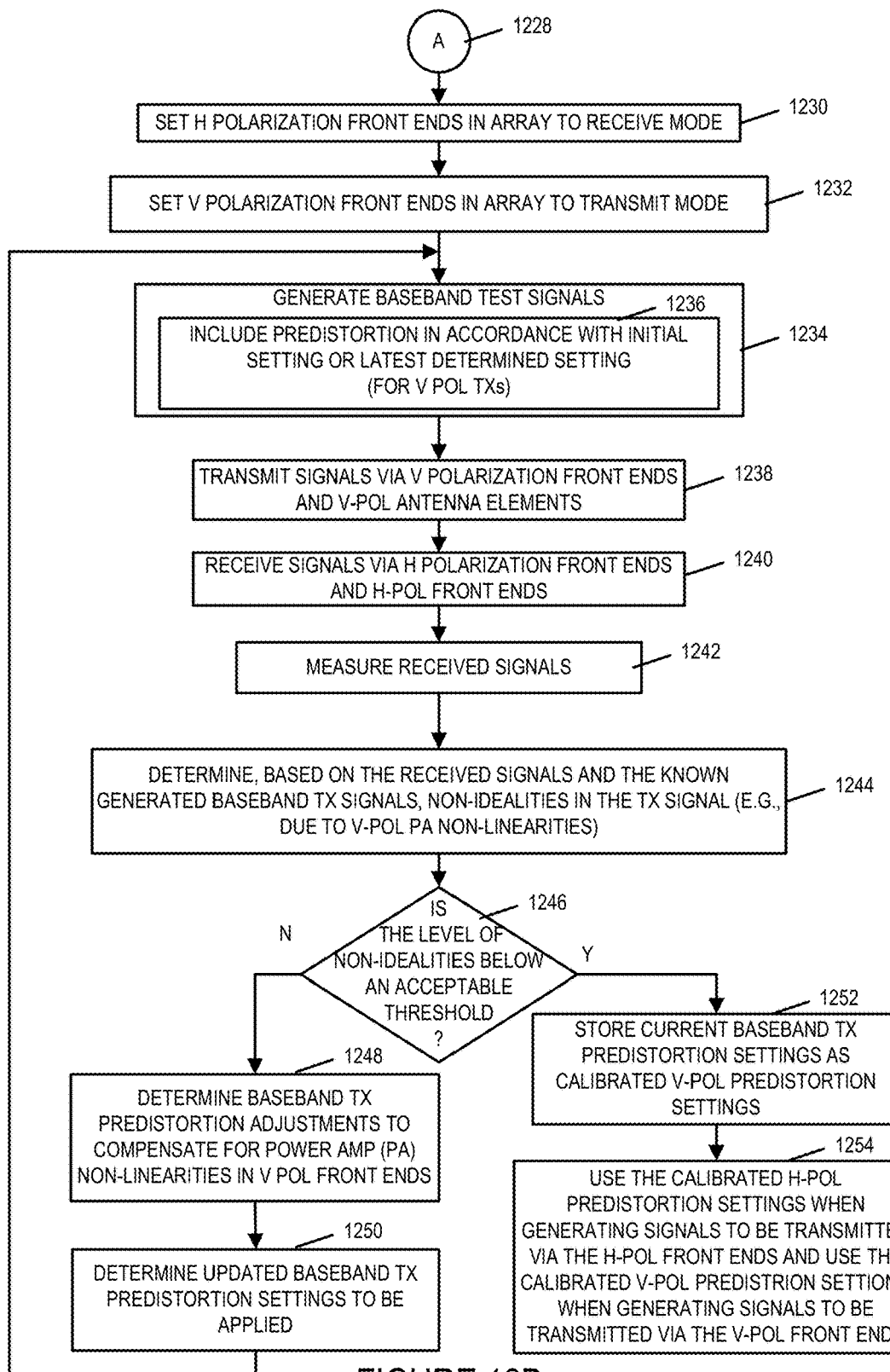
FIG. 12B is a second part of a flowchart of an exemplary method of performing calibration to determine pre-distortion calibration coefficients and using the determined pre-distortion calibration coefficients in accordance with an exemplary embodiment.
FIG. 12 comprises the combination of FIG. 12A and FIG. 12B.

FIG. 12, comprising the combination of FIG. 12A and FIG. 12B, is a flowchart 1200 of an exemplary method of performing calibration to determine pre-distortion calibration coefficients and using the determined pre-distortion calibration coefficients in accordance with an exemplary embodiment. Operation starts in step 1202 in which the system, e.g., system 1100 of FIG. 11 is powered on and initialized. Operation proceeds from start step 1202 to step 1204. In step 1204 the horizontal polarization (H-pol) front ends, e.g., elements (1108, 1110, . . . , 1112) in the array are set to transmit mode. Operation proceeds from step 1204 to step 1206. In step 1206 the vertical-polarization (V-pol) front ends, e.g., elements (1132, 1134, . . . , 1136), in the array are set to receive mode. Operation proceeds from step 1206 to step 1208.

In step 1208 the baseband transmitter, e.g., baseband transmitter 1102, generates baseband test signals. Step 1208 includes step 1210 in which the baseband transmitter includes predistortion in accordance with an initial setting or the latest determined setting for H-pol transmitters. Operation proceeds from step 1208 to step 1212.

In step 1212 the baseband transmitter 1102 transmits the generated signals via H-polarization front ends, feed lines to the H-pol antenna elements and the H-pol antenna elements. Operation proceeds from step 1212 to step 1214. In step 1214 the transmitted signals are received via the V-pol antenna elements, feed lines from the Vpol antenna elements and the V-pol front ends. Operation proceeds from step 1214 to step 1216 in which the received signals are measured by the baseband receiver 1128. Operation proceeds from step 1216 to step 1218.

In step 1218 the digital pre-distortion (DPD) calibration component 1144 determines, based on received signals and the known generated baseband TX signals, non-idealities in the TX signal, e.g due to H-Pol PA non-linearities. Operation proceeds from step 1218 to step 1220. In step 1220 the DPD calibration component 1144 determines if the level of non-idealities is below an acceptable threshold. If the determination of step 1220 is that the level of non-idealities is not below the acceptable threshold then operation proceeds from step 1220 to step 1222 in which the DPD calibration component 1144 determines baseband TX predistortion adjustments to compensate for power amp (PA) non-idealities in the H pol front ends. Operation proceeds from step 1222 to step 1224. In step 1224 the DPD calibration component 1114 determines updated baseband TX predistortion setting to be applied and sends those values to the baseband transmitter 1102 to continue with the calibration.

Alternatively, if the determination of step 1220 is that the level of non-idealities is below the acceptable threshold then operation proceeds from step 1220 to step 1226 in which the DPD calibration component 1144 commands the baseband transmitter 1102 to store the current baseband predistortion setting as calibrated H-pol predistortion settings. Operation proceeds from step 1226 via connecting node A 1228 to step 1230.

In step 1230 the vertical-polarization (H-pol) front ends, e.g., elements, in the array are set to receive mode. Operation proceeds from step 1230 to step 1232. In step 1232 the horizontal polarization (V-pol) front ends in the array are set to transmit mode. Operation proceeds from step 1232 to step 1234.

In step 1234 the baseband transmitter, generates baseband test signals. Step 1234 includes step 1236 in which the baseband transmitter includes predistortion in accordance with an initial setting or the latest determined setting for V-pol transmitters. Operation proceeds from step 1234 to step 1238.

In step 1238 the baseband transmitter transmits the generated signals via V-polarization front ends, feed lines to the V-pol antenna elements and the V-pol antenna elements. Operation proceeds from step 1238 to step 1240. In step 1240 the transmitted signals are received via the H-pol antenna elements, feed lines from the H-pol antenna elements and the H-pol front ends. Operation proceeds from step 1240 to step 1242 in which the received signals are measured by the baseband receiver. Operation proceeds from step 1242 to step 1244.

In step 1244 the digital pre-distortion (DPD) calibration component determines, based on received signals and the known generated baseband TX signals, non-idealities in the TX signal, e.g. due to V-Pol PA non-linearities. Operation proceeds from step 1244 to step 1246. In step 1246 the DPD calibration component determines if the level of non-idealities is below an acceptable threshold. If the determination of step 1246 is that the level of non-idealities is not below the acceptable threshold then operation proceeds from step 1246 to step 1248 in which the DPD calibration component determines baseband TX predistortion adjustments to compensate for power amp (PA) non-idealities in the V-pol front ends. Operation proceeds from step 1248 to step 1250. In step 1250 the DPD calibration component determines updated baseband TX predistortion setting to be applied and sends those values to the baseband transmitter to continue with the calibration.

Alternatively, if the determination of step 1246 is that the level of non-idealities is below the acceptable threshold then operation proceeds from step 1246 to step 1252 in which the DPD calibration component commands the baseband transmitter to store the current baseband predistortion setting as calibrated V-pol predistortion settings. Operation proceeds from step 1252 to step 1254. In step 1254 the baseband transmitter with predistorter 1102 uses the calibrated H-pol predistortion setting when generating signals, e.g., data signals, to be transmitted via the H-pol front ends and uses the calibrated V-pol predistortion setting when generating signals to be transmitted via the V-pol front ends.

Figure 13A:
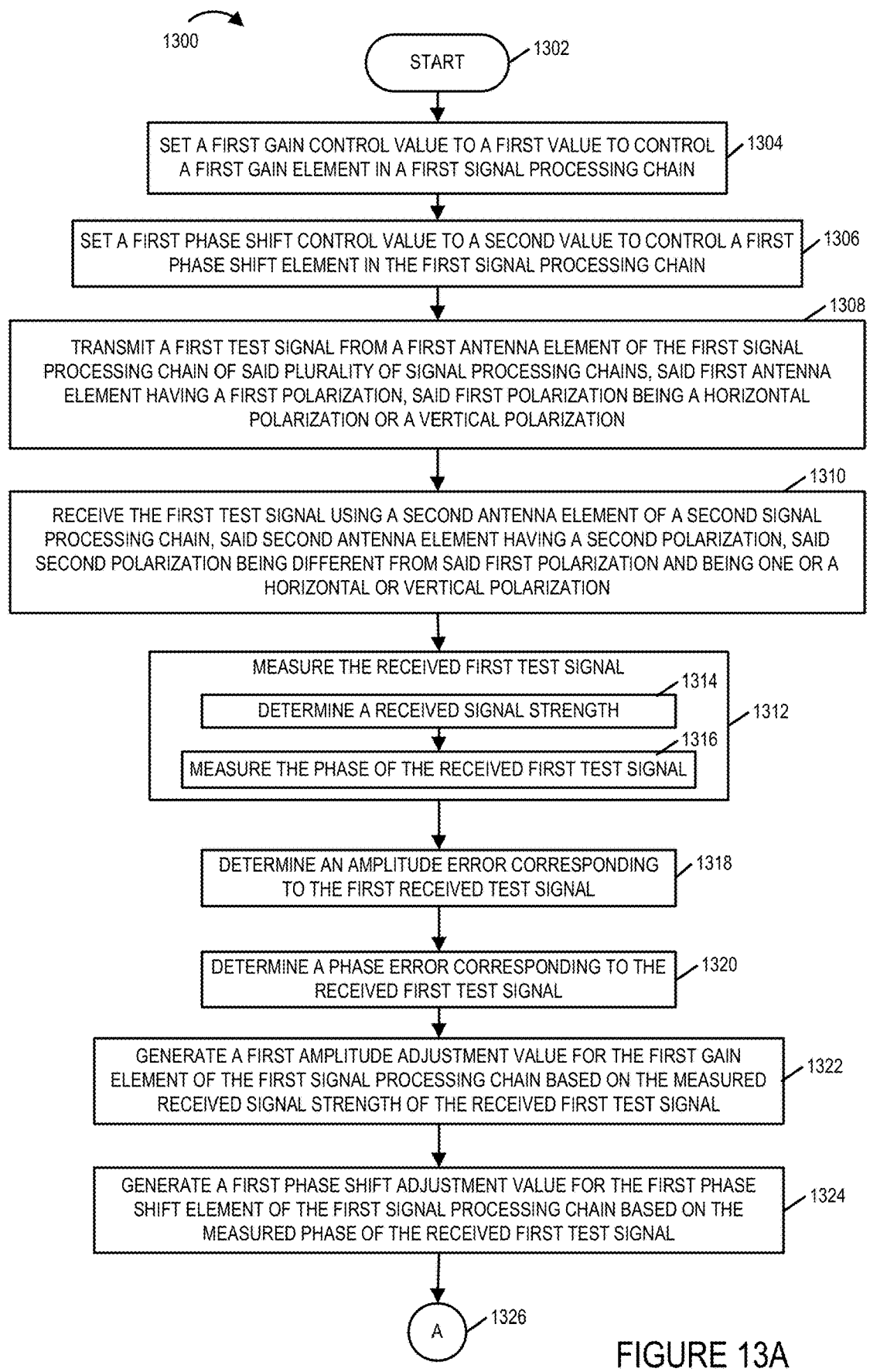
FIG. 13A is first part of a flowchart of an exemplary method of calibrating a plurality of signal processing chains of a communications device in accordance with an exemplary embodiment.
Figure 13B:
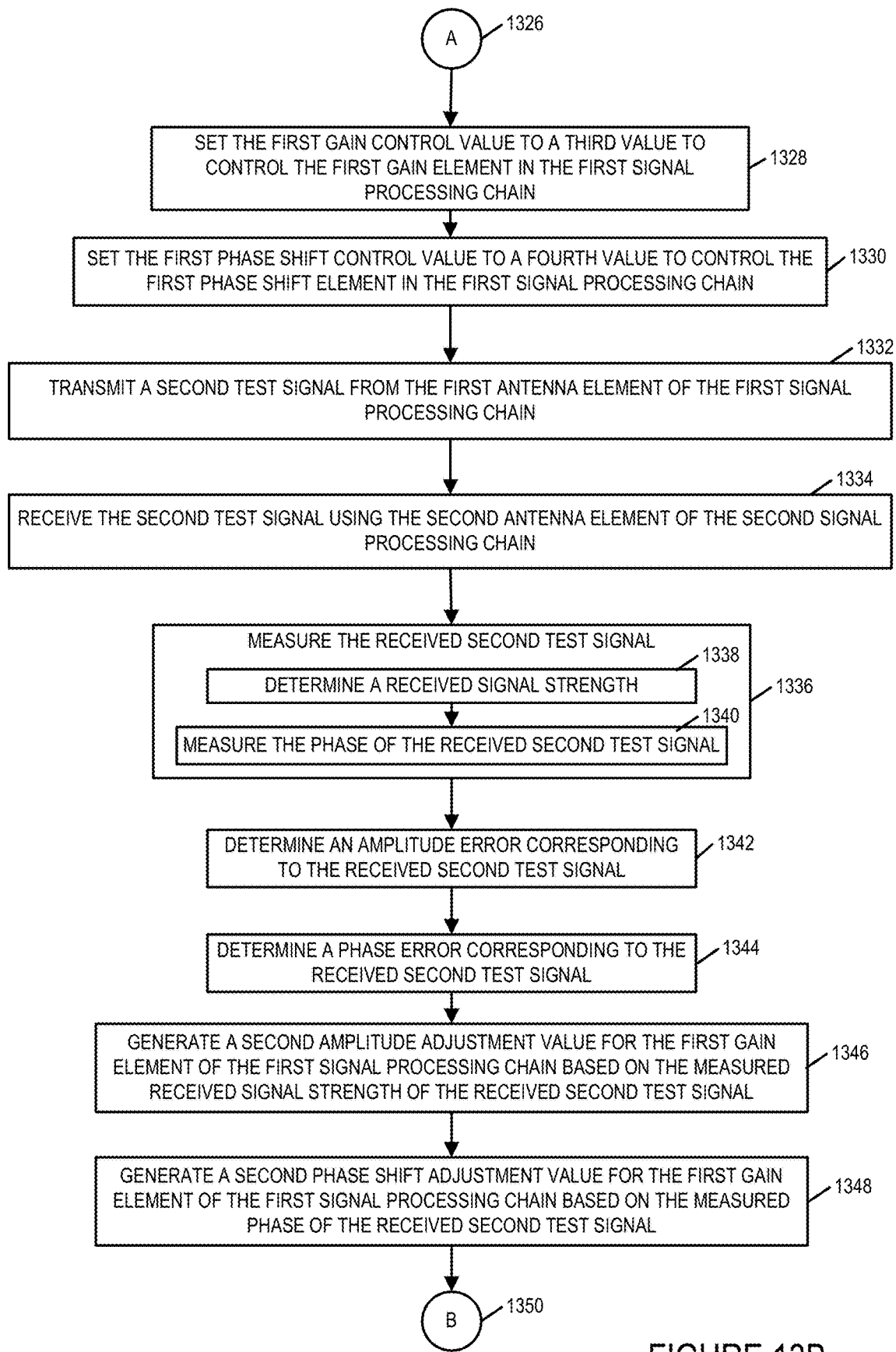
FIG. 13B is second part of a flowchart of an exemplary method of calibrating a plurality of signal processing chains of a communications device in accordance with an exemplary embodiment.
Figure 13C:
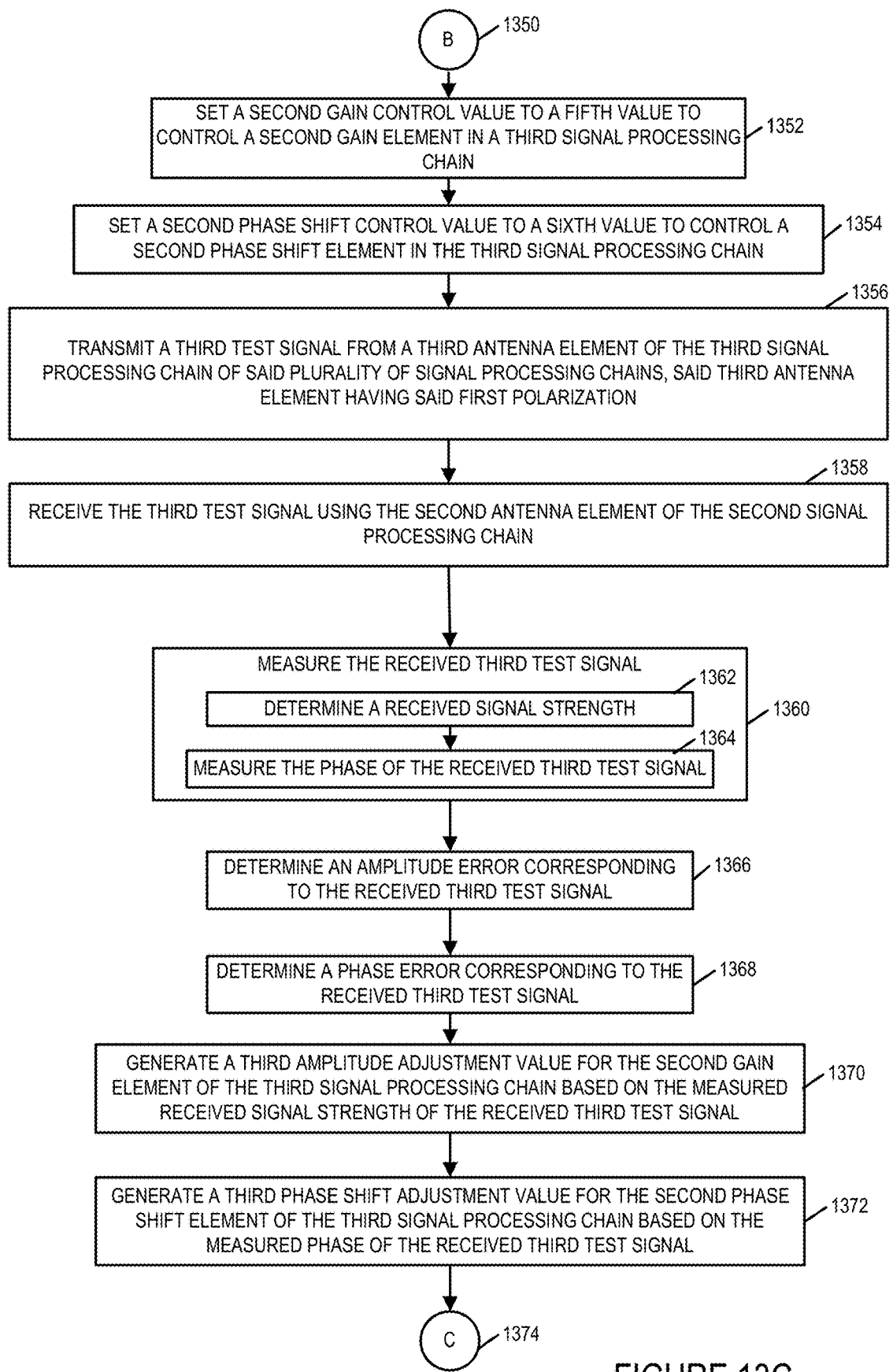
FIG. 13C is third part of a flowchart of an exemplary method of calibrating a plurality of signal processing chains of a communications device in accordance with an exemplary embodiment.
Figures 13, 13D:
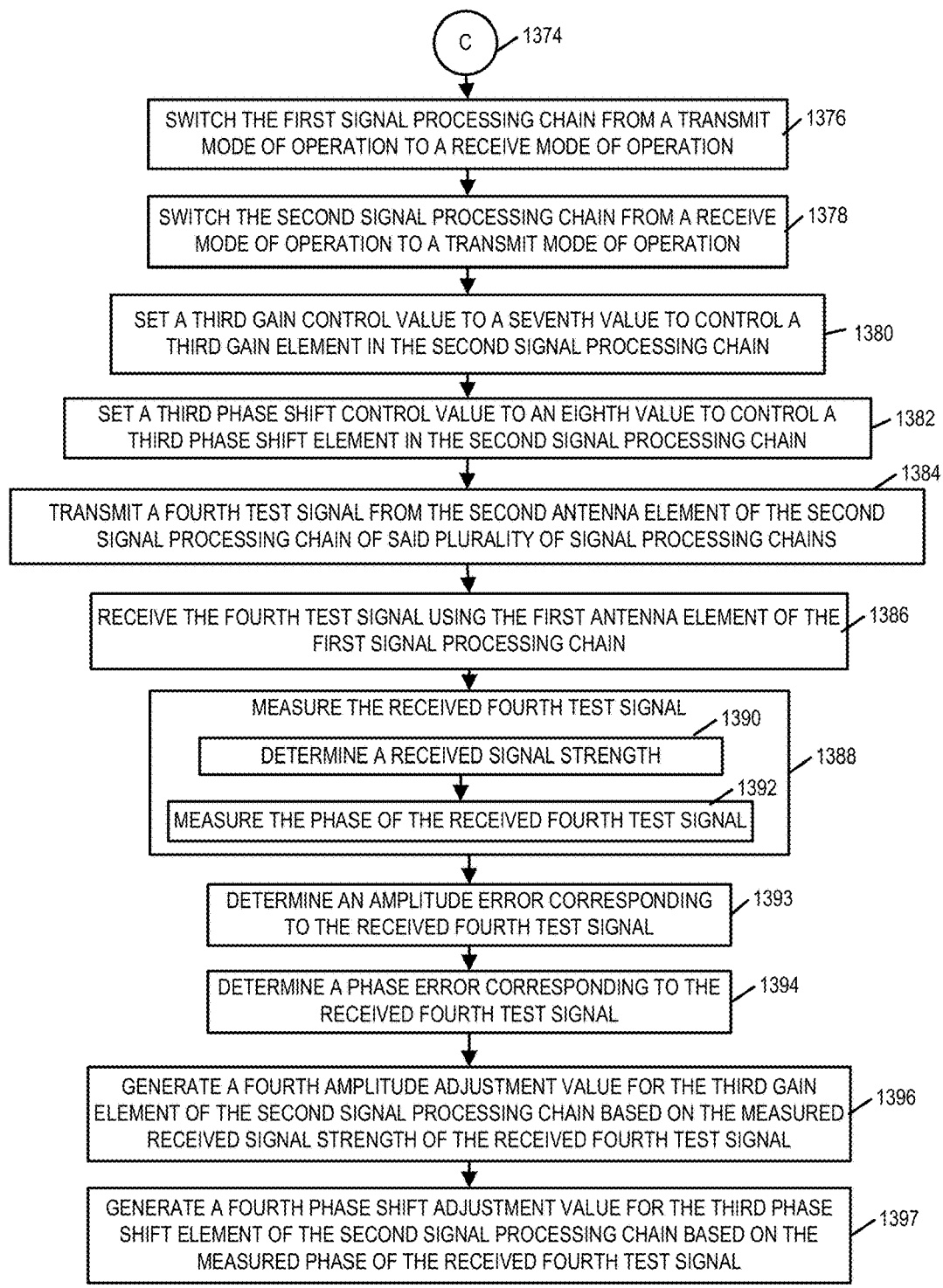
FIG. 13D is fourth part of a flowchart of an exemplary method of calibrating a plurality of signal processing chains of a communications device in accordance with an exemplary embodiment.
FIG. 13 comprises the combination of FIG. 13A, FIG. 13B, FIG. 13C and FIG. 13D.

FIG. 13, comprising the combination of FIG. 13A, FIG. 13B, FIG. 13C and FIG. 13D, is a flowchart 1300 of an exemplary method of calibrating a plurality of signal processing chains of a communications device in accordance with an exemplary embodiment. Operation starts in step 1302 in which an exemplary communications system is powered on and initialized. In some embodiments, the exemplary communications system implementing the method of flowchart 1300 is included within a communications device, e.g., a communications device including a plurality of H-Pol RX/TX front ends, e.g., in an array, a plurality of V-Pol RX/TX front ends, e.g., in an array, wherein each front end includes a controllable gain element and a controllable phase element, H-pol antenna elements, V-Pol antenna elements, antenna feed lines, a calibration controller, a processor, a test signal generator, a baseband receiver, an error determination component, and a calibration determination component.

Operation proceeds from step 1302 to step 1304. In step 1304, a first gain control value (e.g., gain control for H1 318) is set, e.g., by calibration controller 208, to a first value (e.g. G1) to control a first gain element in a first signal processing chain (e.g., the first signal processing chain including H1 frontend 102'). Operation proceeds from step 1304 to step 1306.

In step 1306, a first phase shift control value (e.g., phase shift control for H1 320) is set, e.g., by calibration controller 208, to a second value (e.g. Φ1) to control a first phase shift element in the first signal processing chain. Operation proceeds from step 1306 to step 1308.

In step 1308 a first test signal is transmitted from a first antenna element (e.g., H-pol antenna element 106h') of the first signal processing chain in said plurality of signal processing chains, said first antenna element having a first polarization, said first polarization being a horizontal polarization or a vertical polarization. Operation proceeds from step 1308 to step 1310.

In step 1310 the first test signal is received using a second antenna element (e.g., V-pol antenna element 106v') of a second signal processing chain (e.g., the second signal processing chain including V1 frontend 104'), said second antenna element having a second polarization, said second polarization being different from said first polarization and being one of a horizontal polarization or a vertical polarization. Operation proceeds from step 1310 to step 1312.

In step 1312 the received first test signal is measured (e.g., by baseband receiver 290). Step 1312 includes step 1314 in which a received signal strength is measured, and step 1316 in which the phase of the received first test signal is measured. Operation proceeds from step 1312 to step 1318.

In step 1318 an amplitude error corresponding to the received first test signal is determined (e.g., by error determination components 293). Operation proceeds from step 1318 to step 1320. In step 1320 a phase error corresponding to the received first test signal is determined (e.g., by error determination components 293). Operation proceeds from step 1320 to step 1322.

In step 1322 a first amplitude adjustment value for the first gain element of the first signal processing chain based on the received signal strength of the received first test signal is determined (e.g., by calibration determination component 298). Operation proceeds from step 1322 to step 1324. In step 1324 a first phase shift adjustment value for the first phase shift element of the first signal processing chain based on the received signal strength of the received first test signal is determined (e.g., by calibration determination component 298).

In some embodiments, the first amplitude adjustment value is a gain correction value which is combined with a desired gain control value for a beam direction to generate a gain control value which is stored in a beam table (e.g., a beam table in H1) and which is used to control the first gain element (e.g., the controllable gain element in H1) to transmit a data signal. In some embodiments, the first phase shift adjustment value is a phase correction value which is combined with a desired phase shift control value for a beam direction to generate a phase shift control value which is stored in a beam table (e.g., the beam table in H1) and which is used to control the first phase shift element (e.g., the controllable phase shift element in H1) to transmit a data signal.

Operation proceeds from step 1324, via connecting node A 1326, to step 1328. In step 1328, the first gain control value (e.g., gain control for H1 318) is set, e.g., by calibration controller 208, to a third value (e.g., G1 or G2) to control a first gain element in a first signal processing chain (e.g., the first signal processing chain including H1 frontend 102'). Operation proceeds from step 1328 to step 1330.

In step 1330, the first phase shift control value (e.g., phase shift control for H1 320) is set, e.g., by calibration controller 208, to a fourth value (e.g. Φ1 or Φ1 or Φ3) to control a first phase shift element in the first signal processing chain, wherein at least one of: the first value is different from the third value or the second value is different than the fourth value. Operation proceeds from step 1330 to step 1332.

In step 1332 a second test signal is transmitted from the first antenna element (e.g., H-pol antenna element 106h') of the first signal processing chain. Operation proceeds from step 1332 to step 1334.

In step 1334 the second test signal is received using the second antenna element (e.g., V-pol antenna element 106v') of a second signal processing chain (e.g., the second signal processing chain including V1 frontend 104'). Operation proceeds from step 1334 to step 1336.

In step 1336 the received second test signal is measured (e.g., by baseband receiver 290). Step 1336 includes step 1338 in which a received signal strength is measured, and step 1340 in which the phase of the received second test signal is measured. Operation proceeds from step 1336 to step 1342.

In step 1342 an amplitude error corresponding to the received second test signal is determined (e.g., by error determination components 293). Operation proceeds from step 1342 to step 1344. In step 1344 a phase error corresponding to the received second test signal is determined (e.g., by error determination components 293). Operation proceeds from step 1344 to step 1346.

In step 1346 a second amplitude adjustment value for the first gain element of the first signal processing chain based on the received signal strength of the received second test signal is determined (e.g., by calibration determination component 298). Operation proceeds from step 1346 to step 1348. In step 1348 a second phase shift adjustment value for the first phase shift element of the first signal processing chain based on the received signal strength of the received second test signal is determined (e.g., by calibration determination component 298).

In some embodiments, the second amplitude adjustment value is a gain correction value which is combined with a desired gain control value for a beam direction to generate a gain control value which is stored in a beam table (e.g., the beam table in H1) and which is used to control the first gain element to transmit a data signal. In some embodiments, the second phase shift adjustment value is a phase correction value which is combined with a desired phase shift control value for a beam direction to generate a phase shift control value which is stored in a beam table (e.g., the beam table in H1) and which is used to control the first phase shift element to transmit a data signal.

Operation proceeds from step 1348, via connecting node B 1350, to step 1352. In step 1352, a second gain control value (e.g., gain control for H2 333) is set, e.g., by calibration controller 208, to a fifth value (e.g. G1) to control a second gain element in a third signal processing chain (e.g., the third signal processing chain including H2 frontend 102"). Operation proceeds from step 1352 to step 1354.

In step 1354, a second phase shift control value (e.g., phase shift control for H2 322) is set, e.g., by calibration controller 208, to a sixth value (e.g. Φ1) to control a second phase shift element in the third signal processing chain. Operation proceeds from step 1354 to step 1356.

In step 1356 a third test signal is transmitted from a third antenna element (e.g., H-pol antenna element 106h") of the third signal processing chain in said plurality of signal processing chains, said third antenna element having said first polarization. Operation proceeds from step 1356 to step 1358.

In step 1358 the third test signal is received using the second antenna element (e.g., V-pol antenna element 106v') of a second signal processing chain (e.g., the second signal processing chain including V1 frontend 104'). Operation proceeds from step 1358 to step 1360.

In step 1360 the received third test signal is measured (e.g., by baseband receiver 290). Step 1360 includes step 1362 in which a received signal strength is measured, and step 1364 in which the phase of the received third test signal is measured. Operation proceeds from step 1360 to step 1366.

In step 1366 an amplitude error corresponding to the received third test signal is determined (e.g., by error determination components 293). Operation proceeds from step 1366 to step 1368. In step 1368 a phase error corresponding to the received third test signal is determined (e.g., by error determination components 293). Operation proceeds from step 1368 to step 1370.

In step 1370 a third amplitude adjustment value for the second gain element of the third signal processing chain based on the received signal strength of the received first test signal is determined (e.g., by calibration determination component 298). Operation proceeds from step 1370 to step 1372. In step 1372 a third phase shift adjustment value for the second phase shift element of the third signal processing chain based on the received signal strength of the received third test signal is determined (e.g., by calibration determination component 298).

In some embodiments, the third amplitude adjustment value is a gain correction value which is combined with a desired gain control value for a beam direction to generate a gain control value which is stored in a beam table (e.g., a beam table in H2) and which is used to control the second gain element (e.g., the controllable gain element in H2) to transmit a data signal. In some embodiments, the third phase shift adjustment value is a phase correction value which is combined with a desired phase shift control value for a beam direction to generate a phase shift control value which is stored in a beam table (e.g., the beam table in H2) and which is used to control the second phase shift element (e.g., the controllable phase shift element in H2) to transmit a data signal.

Operation proceeds from step 1372, via connecting node C 1374, to step 1376. In step 1376, the first signal processing chain is switched from a transmit mode of operation to a receive mode of operation, (e.g., in response a H-Pol TX/RX switch setting signal 314 sent from controller 208 which commands receive mode). Operation proceeds from step 1376 to step 1378. In step 1378, the second signal processing chain is switched from a receive mode of operation to a transmit mode of operation, (e.g., in response a V-Pol TX/RX switch setting signal 316 sent from controller 208 which commands receive mode). Operation proceeds from step 1378 to step 1380.

In step 1380, a third gain control value (e.g., gain control for V1 334) is set, e.g., by calibration controller 208, to a seventh value (e.g. G1) to control a third gain element in the second signal processing chain (e.g., the second signal processing chain including V1 frontend 104'). Operation proceeds from step 1380 to step 1382.

In step 1382, a third phase shift control value (e.g., phase shift control for V1 336) is set, e.g., by calibration controller 208, to a second value (e.g. Φ1) to control a third phase shift element in the second signal processing chain. Operation proceeds from step 1382 to step 1384.

In step 1384 a fourth test signal is transmitted from the second antenna element (e.g., V-pol antenna element 106v') of the second signal processing chain of said plurality of signal processing chains. Operation proceeds from step 1384 to step 1386.

In step 1386 the fourth test signal is received using the first antenna element (e.g., H-pol antenna element 106h') of the first signal processing chain (e.g., the first signal processing chain including H1 frontend 102'), said second antenna element having a second polarization, said second polarization being different from said first polarization and being one of a horizontal polarization or a vertical polarization. Operation proceeds from step 1386 to step 1388.

In step 1388 the received fourth test signal is measured (e.g., by baseband receiver 290). Step 1388 includes step 1390 in which a received signal strength is measured, and step 1392 in which the phase of the received fourth test signal is measured. Operation proceeds from step 1388 to step 1393.

In step 1393 an amplitude error corresponding to the received fourth test signal is determined (e.g., by error determination components 293). Operation proceeds from step 1393 to step 1394. In step 1394 a phase error corresponding to the received fourth test signal is determined (e.g., by error determination components 293). Operation proceeds from step 1394 to step 1396.

In step 1396 a fourth amplitude adjustment value for the third gain element of the second signal processing chain based on the received signal strength of the received fourth test signal is determined (e.g., by calibration determination component 298). Operation proceeds from step 1396 to step 1397. In step 1397 a fourth phase shift adjustment value for the third phase shift element of the second signal processing chain based on the received signal strength of the received fourth test signal is determined (e.g., by calibration determination component 298).

In some embodiments, the fourth amplitude adjustment value is a gain correction value which is combined with a desired gain control value for a beam direction to generate a gain control value which is stored in a beam table (e.g., a beam table in V1) and which is used to control the third gain element (e.g., the controllable gain element in V1) to transmit a data signal. In some embodiments, the fourth phase shift adjustment value is a phase correction value which is combined with a desired phase shift control value for a beam direction to generate a phase shift control value which is stored in a beam table (e.g., the beam table in V1) and which is used to control the third phase shift element (e.g., the controllable phase shift element in V1) to transmit a data signal.

In one exemplary embodiment the first signal processing chain includes H-Pol front end H1 102', antenna feed line 136' and H-Pol antenna element 106h'; the second signal processing chain includes V-Pol front end V1 104', antenna feed line 176' and V-Pol antenna element 106v'; and the third signal processing chain includes H-Pol front end H2 102", antenna feed line 136" and H-Pol antenna element 106h".

Notable, in various embodiments implemented in accordance with various features of the present invention, the loopback path incorporates each of the circuits, feed lines and components up to and including the antenna. Therefore the exemplary methods, in accordance with the present invention, enables calibration of gain/phase imperfections and non-linearities arising from on-chip and off-chip components, as opposed to prior art approaches which do not enable calibration of gain/phase imperfections and non-linearities arising from off-chip components, e.g., lead lines and antennas.

In accordance with a feature of some embodiments, cross-polarization is used between polarization feeds in order to create complete TX-RX paths for array calibration as well as single element TX calibration.

The exemplary methods and apparatus, in accordance with the present invention, can be, and sometimes are, applied to other implementations, e.g., transceiver implementations that include on-chip frequency upconversion and/or downconversion. Benefits again include a sensing and loopback scheme that incorporates entire signal chain up to and including the antenna and thus enables calibration of gain/phase imperfections and non-linearities arising from on-chip and off-chip components.

Extending the sensing point to the antenna, e.g., for calibration in accordance with a feature of various exemplary embodiments, is beneficial even for implementations that include frequency up-conversion and/or down conversion and/or local oscillator (LO) generation in the same chip as the phased array frontend.

Numbered embodiments in the following lists that refer to a previous numbered embodiment refer to the numbered embodiment in the same set of numbered embodiments.

First Numbered List of Exemplary Method Embodiments

Method Embodiment 1 A method of calibrating a plurality of signals processing chains (103', 103", 103''', 103'''', 105', 105", 105''', 105'''') of a communications device (200), the method comprising: setting (1304) a first gain control value (used to control a first gain element) to a first value to control a first gain element (118') in a first signal processing chain (103'); transmitting (1308) a first test signal from a first antenna element (106h') of the first signal processing chain (103') of said plurality of signal processing chains (103', 103", 103''', 103'''', 105', 105", 105''', 105''''), said first antenna element (106h') have a first polarization, said first polarization being a horizontal polarization or a vertical polarization; receiving (1310) the first test signal using a second antenna element (106v') of a second signal processing chain (105') of said plurality of signal processing chains (103', 103", 103''', 103'''', 105', 105", 105''', 105''''), said second antenna element (106v') having a second polarization, said second polarization being different from said first polarization and being one of a horizontal polarization or a vertical polarization; measuring (1312) the received first test signal, wherein measuring (1312) the received first test signal includes determining (1314) a received signal strength; determining (1318) an amplitude error corresponding to the first received test signal; and generating (1322) a first amplitude adjustment value for the first gain element (118') of the first signal processing chain (103') based on the measured received signal strength of the received first test signal.

Method Embodiment 2 The method of Method Embodiment 1, wherein the first signal processing chain (103') further includes a first phase shift element (120'), the method further comprising: setting (1306) a first phase shift control value (used to control a first phase shift element) to a second value to control the first phase shift element (120') in the first signal processing chain (103'); wherein measuring (1312) the received first test signal further includes measuring (1316) the phase of the received first test signal; determining (1320) a phase error corresponding to the first received test signal; generating (1324) a first phase shift adjustment value for the first phase shift element of the first signal processing chain (103') based on the measured received signal phase of the received first signal.

Method Embodiment 3 The method of Method Embodiment 2, wherein the first amplitude adjustment value is a gain correction value which is combined with a desired gain control value for a beam direction to generate a gain control value which is stored in a beam table (116') and which is used to control the first gain element (118') to transmit a data signal.

Method Embodiment 4 The method of Method Embodiment 3, wherein the first phase shift adjustment value is a phase correction value which is combined with a desired phase shift control value for a beam direction to generate a phase shift control value which is stored in a beam table (116') and which is used to control the first phase shift element (120') to transmit a data signal.

Method Embodiment 5 The method of Method Embodiment 1, further comprising: setting (1328) the first gain control value to a third value to control the first gain element (118') in the first signal processing chain (103'); transmitting (1332) a second test signal from the first antenna element (106h') of the first signal processing chain (103'); receiving (1334) the second test signal using the second antenna element (106v') of a second signal processing chain (105'); measuring (1336) the received second test signal, wherein measuring the received second test signal includes determining (1338) a received signal strength corresponding to the received second test signal; determining (1342) an amplitude error corresponding to the second received test signal; and generating (1346) a second amplitude adjustment value for the first gain element (118') of the first signal processing chain (103') based on the measured received signal strength of the received second test signal.

Method Embodiment 6 The method of Method Embodiment 5, further comprising: setting (1330) the first phase shift control value to a fourth value to control the first phase shift element (120') in the first signal processing chain (103'), wherein at least one of: the first value is different from the third value or the second value is different than the fourth value; wherein measuring (1336) the received second test signal further includes determining (1340) the phase of the received second test signal; determining (1344) a phase error corresponding to the second received test signal; and generating (1348) a second phase shift adjustment value for the first phase shift element (120') of the first signal processing chain (103') based on the measured received signal phase of the received second test signal.

Method Embodiment 7 The method of Method Embodiment 1, further comprising: setting (1352) a second gain control value (used to control a second gain element) to a fifth value to control the second gain element (118") in a third signal processing chain (103") in said plurality of signal processing chains (103', 103", 103''', 103'''', 105', 105", 105''', 105''''); transmitting (1356) a third test signal from a third antenna element (106h") of the third signal processing chain (103"), said third antenna element (106h") have the first polarization; receiving (1358) the third test signal using the second antenna element (106v') of the second signal processing chain (105'); measuring (1360) the received third test signal, wherein measuring the received third test signal includes determining (1362) a received signal strength corresponding to the received third test signal; determining (1366) an amplitude error corresponding to the third received test signal; and generating (1370) a third amplitude adjustment value for the second gain element (118") of the third signal processing chain (103") based on the measured received signal strength of the received third test signal.

Method Embodiment 8 The method of Method Embodiment 7, wherein the third signal processing chain (103") further includes a second phase shift element (120"), the method further comprising: setting (1354) a second phase shift control value (used to control a second phase shift element) to a sixth value to control the second phase shift element (120") in the third signal processing chain (103"); wherein measuring (1360) the received third test signal further includes measuring (1364) the phase of the received third test signal; determining (1368) a phase error corresponding to the received third test signal; and generating (1372) a third phase shift adjustment value for the second phase shift element (120") of the third signal processing chain (103") based on the measured received signal phase of the received third test signal.

Method Embodiment 9 The method of Method Embodiment 1, further comprising: switching (1376) the first signal processing chain (103') from a transmit mode of operation to a receive mode of operation; switching (1378) the second signal processing chain (105') from a received mode of operation to a transmit mode of operation; setting (1380) a third gain control value (used to control a third gain element) to a seventh value to control a third gain element (158') in the second signal processing chain (105'); transmitting (1384) a fourth test signal from the second antenna element (106v') of the second signal processing chain (105'); receiving (1386) the fourth test signal using a first antenna element (106h') of the first signal processing chain (103'); measuring (1388) the received fourth test signal, wherein measuring the received fourth test signal includes determining (1390) a received signal strength corresponding to the fourth test signal; determining (1393) an amplitude error corresponding to the first received test signal; generating (1396) a fourth amplitude adjustment value for the third gain element (158') of the second signal processing chain (105') based on the measured received signal strength of the received fourth test signal.

Method Embodiment 10 The method of Method Embodiment 9, further comprising: setting (1382) a third phase shift control value (used to control a third phase shift element) to an eighth value to control the third phase shift element (160') in the second signal processing chain (105'); wherein measuring (1388) the received fourth test signal further includes measuring (1392) the phase of the received fourth test signal; determining (1394) a phase error corresponding to the received fourth test signal; and generating (1397) a fourth phase shift adjustment value for the third phase shift element (160') of the second signal processing chain (105') based on the measured received signal phase of the received fourth test signal.

Second Numbered List of Exemplary Method Embodiments

Method Embodiment 1 A communications method, the method comprising: setting (1204) a first plurality of signal processing chains (1103', 1103", 1103'''), in an array of signal processing chains (1103', 1103", 1103''', 1105', 1105", 1105''') to operate in a transmit mode of operation, signal processing chains in the first plurality of signal processing chains (1103', 1103", 1103''') having a first polarization; setting (1206) a second plurality of signal processing chains (1105', 1105", 1105'''), in the array of signal processing chains (1103', 1103", 1103''', 1105', 1105", 1105''') to operate in a receive mode of operation, said second plurality of signal processing chains (1105', 1105", 1105''') having a second polarization which is different from said first polarization; generating (1208) a first test signal; transmitting (1212) the first test signal using the first plurality of signal chains (1103', 1103", 1103''') having the first polarization, each individual signal processing chain (1103', 1103", 1103''') transmitting the test signal via an antenna element (1120h, 1122h, 1124h) corresponding to the individual signal processing chain (1103', 1103", 1103'''); receiving (1214) the transmitted first test signal using the second plurality of signal processing chains (1105', 1105", 1105'''), each of the second plurality of signal chains (1105', 1105", 1105''') using an antennal element (1120v, 1122v, 1124v) corresponding the individual signal processing chain (1105', 1105", 1105''') to receive the test signal; and determining (1218) based on the signals received by the second plurality of signal processing chains (1105', 1105", 1105''') non-idealities in the transmitted signal that was received by the second plurality of signal processing chains (1105', 1105", 1105''').

Method Embodiment 2 The method of Method Embodiment 1, further comprising: generating (1208 in a second iteration) an additional test signal, said additional test signal being a different test signal than the first test signal; transmitting (1212 second iteration) the additional test signal using the first plurality of signal chains (1103', 1103", 1103''') having the first polarization, each individual signal processing chain (1103', 1103", 1103''') transmitting the test signal via an antenna element (1120h, 1122h, 1124h) corresponding to the individual signal processing chain (1103', 1103", 1103'''); receiving (1214 second iteration) the transmitted additional test signal using the second plurality of signal processing chains (1105', 1105", 1105'''), each of the second plurality of signal chains (1105', 1105", 1105''') using an antenna element (1120v, 1122v, 1124v) corresponding the individual signal processing chain (1105', 1105", 1105''') to receive the test signal; and determining (1218 second iteration) based on the signals received by the second plurality of signal processing chains (1105', 1105", 1105''') non-idealities in the transmitted additional signal that was received by the second plurality of signal processing chains (1105', 1105", 1105''').

Method Embodiment 3 The method of Method Embodiment 2, further comprising: checking (1220) if the non-idealities in the transmitted additional signal that was received by the second plurality of signal processing chains (1105', 1105", 1105''') is below a threshold corresponding to an acceptable number of non-idealities; and when the non-idealities are above the threshold, modifying (1210) signal pre-distortion performed on a baseband test signal to include signal pre-distortion determined (1222, 1224) based on the signals received by the second plurality of signal processing chains (1105', 1105", 1105'''); and when the non-idealities are at or below the acceptable number of non-idealities, storing (1226) current baseband pre-distortion settings; and using (1254) the baseband pre-distortion settings to control signal pre-distortion when transmitting data using signal processing chains in said first plurality of signal processing chains (1103', 1103", 1103''').

Method Embodiment 4 The method of Method Embodiment 3, further comprising: repeating said steps of: i) generating (1208 third iteration) an additional test signal; ii) transmitting (1212 third iteration) the additional test signal using the first plurality of signal chains (1103', 1103", 1103'") having the first polarization, ii) receiving (1214 third iteration) the transmitted additional test signal using the second plurality of signal processing chains (1105', 1105", 1105'"), each of the second plurality of signal chains (1105', 1105", 1105'") using an antennal element (1120*v*, 1122*v*, 1124*v*) corresponding the individual signal processing chain (1105', 1105", 1105'") to receive the test signal; and iv) determining (1218 third iteration) based on the signals received by the second plurality of signal processing chains non-idealities in the transmitted additional signal that was received by the second plurality of signal processing chains (1105', 1105", 1105'") and v) checking (1220 third iteration) if the non-idealities in the transmitted additional signal that was received by the second plurality of signal processing chains (1105', 1105", 1105'") is below a threshold corresponding to an acceptable number of non-idealities until the determined non-idealities are at or below said threshold.

Method Embodiment 5 The communications method of Method Embodiment 1, further comprising: setting (1230) the first plurality of signal processing chains (1103', 1103", 1103'") in the array of signal processing chains to operate in a receive mode of operation; setting (1323) the second plurality of signal processing chains (1105', 1105", 1105'"), in the array of signal processing chains (1103, 1103', 1103", 1105', 1105", 1105'") to operate in a transmit mode of operation; generating (1234) a second test signal; transmitting (1212) the second test signal using the second plurality of signal chains (1105', 1105", 1105'") having the second polarization, each individual signal processing chain (1105', 1105", 1105'") transmitting the second test signal via an antenna element (1120*v*, 1122*v*, 1124*v*) corresponding to the individual signal processing chain (1105', 1105", 1105'"); receiving (1240) the transmitted second test signal using the first plurality of signal processing chains (1103', 1103", 1103'"), each of the first plurality of signal chains (1103', 1103", 1103'") using an antennal element (1120*h*, 1122*h*, 1124*h*) corresponding the individual signal processing chain (1103', 1103", 1103'") to receive the second test signal; and determining (1244) based on the signals received by the first plurality of signal processing chains (1103', 1103", 1103'") non-idealities in the transmitted signal that was received by the first plurality of signal processing chains (1103', 1103", 1103'").

Method Embodiment 6 The method of Method Embodiment 5, further comprising: checking (1246) if the non-idealities in the transmitted second test signal that was received by the first plurality of signal processing chains (1103', 1103", 1103'") is below the threshold corresponding to an acceptable number of non-idealities; and when the non-idealities are above the threshold, modifying (1236) signal pre-distortion performed on a baseband test signal to include signal pre-distortion determined (1246, 1250) based on the signals received by the first plurality of signal processing chains (1103', 1103", 1103'"); and when the non-idealities are at or below the acceptable number of non-idealities, storing (1252) current baseband pre-distortion settings for use when transmitting using the second plurality of signal processing chains (1105', 1105", 1105'"); and using (1254) the baseband pre-distortion settings to control signal pre-distortion when transmitting data using signal processing chains in said second plurality of signal processing chains (1105', 1105", 1105'").

Method Embodiment 7 The method of Method Embodiment 1, wherein first polarization is horizontal polarization and wherein said second polarization is vertical polarization.

Method Embodiment 8 The method of Method Embodiment 7, wherein said each of said first plurality of signal processing chains (1103', 1103", 1103'") includes a horizontal polarization TX/RX front end (1108, 1110, 1112), an antenna feed line (1114, 1116, 1118) and a horizontal polarization antenna element (1120*h*, 1122*h*, 1124*h*).

Method Embodiment 9 The method of Method Embodiment 8, wherein said each of said second plurality of signal processing chains (1105', 1105", 1105'") includes a vertical polarization TX/RX front end (1132, 1134, 1136), an antenna feed line (1126, 1128, 1130) and a vertical polarization antenna element (1120*v*, 1122*v*, 1124*v*).

Third Numbered List of Exemplary Method Embodiments

Method Embodiment 1 A method of setting control values for a plurality of signals processing chains (103', 103", 103'", 103"", 105', 105", 105'", 105"") of a communications device (e.g., device 200 of FIG. 2 including 4 H-Pol processing chains (103', 103", 103'", 103"") and 4 V-pol processing chains (105', 105", 105'", 105"")), the method comprising: transmitting (e.g., see signals 402 and 404 of FIG. 4) a first signal from a first antenna element (e.g., antenna element 106*h*') of a first signal processing chain (e.g., chain 103' including H1 102') of said plurality of signal processing chains, said first antenna element (106*h*') have a first polarization (e.g., Horizontal polarization), said first polarization being a horizontal polarization or a vertical polarization; using different gain control values (e.g. G1 and G2) to control a first gain element (e.g., 118' in H1 102') in the first signal processing chain (103'), use of different gain control values varying the gain applied by the gain element to the first signal prior to transmission (e.g., see column 504 of table 500 including gain settings G1 and G2); receiving (e.g., see signals 404 and 406 of FIG. 4) the first signal using a second antenna element (e.g., antenna element 106*v*') of a second signal processing chain (e.g., chain 105' including V1 104') of said plurality of signal processing chains, said second antenna element (106*v*') having a second polarization (e.g., vertical polarization), said second polarization being different from said first polarization and being one of a horizontal polarization or a vertical polarization; measuring the received first signal (e.g., see baseband receiver 290 outputs measured amplitude 291) to determine different received signal strengths corresponding to different gain settings of the first gain element (118') (also see column 536 of table 500 including AR1, AR2, AR3, AR4, AR5, AR6); generating at least a first gain control value for the first gain element (118') of the first signal processing chain (103') based on the measured received signal strengths (e.g., see amp adjustment value 299 output from calibration determination component 298 and calibration values of column 538 of table 500).

Method Embodiment 2 The method of Method Embodiment 1, wherein the first signal processing chain (e.g., chain 103' including H1 102') further includes a first phase shift element (120'), the method further comprising: using different phase shift control values to control the first phase shift element (120') to apply different phase shifts to the first signal prior to transmission (e.g., see column 506 of table 500 including phase setting settings Φ1 and Φ2 and Φ3); measuring the received first signal (e.g., see baseband receiver 290 outputs measured phase 292) to determine different received signal phases corresponding to different phase shift settings of the first phase shift element (120'); and generating at least a first phase shift control value for the first gain element (118') of the first signal processing chain (103') based on the measured received signal phases of the received first signal (e.g., see phase adjustment value 2991 output from calibration determination component 298 and calibration values of column 540 of table 500).

Method Embodiment 3 The method of Method Embodiment 2, wherein the first gain control value is a gain correction value which is combined with a desired gain control value for a beam direction to generate a gain control value which is stored in a beam table (e.g., beam table 116' of H1 102') and which is used to control the first gain element (e.g., 118' of H1 102') when a first beam direction is used to transmit a data signal.

Method Embodiment 4 The method of Method Embodiment 2, further comprising: transmitting (e.g., see signals 702 and 704 of FIG. 7) a second signal from a third antenna element (e.g., antenna element 106h") of a third signal processing chain (e.g., signal processing chain 103" including H2 102") of said plurality of signal processing chains, said third antenna element (106h") have the first polarization (e.g., horizontal polarization); using different gain control values (e.g., G1 and G2) to control a third gain element (e.g., gain element 118") in the third signal processing chain (e.g., signal processing chain 103" including H2 102"), use of different gain control values varying the gain applied by the third gain element (118") to the second signal prior to transmission; receiving the second signal using the second antenna element (e.g., antenna element 106v') of the second signal processing chain (e.g., signal processing chain 105' including V1 104') of said plurality of signal processing chains, said second antenna element (106v') having the second polarization (e.g., vertical polarization); measuring (e.g., see baseband receiver 290 outputs measured amplitude 291) the received second signal to determine different received signal strengths corresponding to different gain settings of the third gain element; generating (e.g., see amp adjustment value 299 output from calibration determination component 298) at least a third gain control value for the third gain element of the third signal processing chain (103") based on the measured received signal strengths of the received second signal.

Method Embodiment 5 The method of Method Embodiment 4, wherein the third signal processing chain (e.g., signal processing chain 103" including H2 102") further includes a third phase shift element (e.g., phase shift element 120" of H2 102"), the method further comprising: using different phase shift control values (e.g., Φ1 and Φ2 and Φ3) to control the third phase shift element (e.g., phase shift element 120" of H2") to apply different phase shifts to the second signal prior to transmission; measuring (e.g., see baseband receiver 290 outputs measured phase 292) the received second signal to determine different received signal phases corresponding to different phase shift settings of the third phase shift element (120"); and generating (e.g., see phase adjustment value 2991 output from calibration determination component 298) at least a third phase shift control value for the third gain element (118") of the third signal processing chain (103") based on the measured received signal phases of the received second signal.

Method Embodiment 6 The method of Method Embodiment 5, further comprising: switching (e.g., see V-Pol TX/RX switches setting signal 316 from controller 206) the second signal processing chain (e.g., signal processing chain 105' including V1 104') from a receive mode of operation to a transmit mode of operation; transmitting a third signal from the second antenna element (e.g., antenna element 106v') of the signal processing chain (e.g., signal processing chain 105' including V1 104') of said plurality of signal processing chains, said second antenna element (106v') have the second polarization; using different gain control values (e.g., G1, G2) to control a second gain element (e.g., gain element 158' in V1 104') in the second signal processing chain, use of different gain control values varying the gain applied by the second gain element (158') to the third signal prior to transmission; receiving the third signal using a first antenna element (e.g., antenna element 106h') of the first signal processing chain (e.g. signal processing chain 103' including H1 102'), said first antenna element (106h') having the first polarization (e.g., horizontal polarization); measuring (e.g., see baseband receiver 290 outputs measured phase 292) the received third signal to determine different received signal strengths corresponding to different gain settings of the second gain element (158v'); generating (e.g., see amp adjustment value 299 output from calibration determination component 298) at least a second gain control value for the second gain element (158v') of the second processing chain (105') based on the measured received signal strengths.

Method Embodiment 7 The method of Method Embodiment 6, wherein the second signal processing chain (e.g., chain 105' including V1 104') further includes a second phase shift element (e.g., phase element 160' of V1 104'), the method further comprising: using different phase shift control values (e.g., Φ1 and Φ2 and Φ3) to control the second phase shift element (e.g., phase shift element 160' of V1 104') to apply different phase shifts to the third signal prior to transmission; measuring (e.g., see baseband receiver 290 outputs measured phase 292) the received third signal to determine different received signal phases corresponding to different phase shift settings of the second phase shift element; and generating (e.g., see amp adjustment value 299 output from calibration determination component 298) at least a second phase shift control value for the second gain element (158') of the second signal processing chain (105') based on the measured received signal phases of the received third signal.

First Numbered List of Exemplary Apparatus Embodiments

Apparatus Embodiment 1 A communications device (200) comprising: a plurality of signal processing chains (103', 103", 103''', 103'''', 105', 105", 105''', 105''''); and a processor (206) for controlling the communications device to perform the steps of a calibration method, the steps including: setting (1304) a first gain control value (used to control a first gain element) to a first value to control a first gain element (118') in a first signal processing chain (103'); transmitting (1308) a first test signal from a first antenna element (106h') of the first signal processing chain (103') of said plurality of signal processing chains (103', 103", 103''', 103'''', 105', 105", 105'41, 105''''), said first antenna element (106h') have a first polarization, said first polarization being a horizontal polarization or a vertical polarization; receiving (1310) the first test signal using a second antenna element (106v') of a second signal processing chain (105') of said plurality of signal processing chains (103', 103", 103''', 103'''', 105', 105", 105''', 105''''), said second antenna element (106v') having a second polarization, said second polarization being different from said first polarization and being one of a horizontal polarization or a vertical polarization; measuring (1312) the received first test signal, wherein measuring (1312) the received first test signal includes determining (1314) a received signal strength; determining (1318) an amplitude error corresponding to the first received test signal; and generating (1322) a first amplitude adjustment value for the first gain element (118') of the first signal processing chain (103') based on the measured received signal strength of the received first test signal.

Second Numbered List of Exemplary Apparatus Embodiments

Apparatus Embodiment 1 A communications device (200 or 1100) comprising: an array of signal processing chains (1103, 1103', 1103", 1105', 1105", 1105'''); and a processor (206) for controlling the communications device (200) to perform the steps of a calibration method, the steps including: setting (1204) a first plurality of signal processing chains (1103', 1103", 1103''') in an array of signal processing chains to operate in a transmit mode of operation, signal processing chains in the first plurality of signal processing chains (1103', 1103", 1103''') having a first polarization; setting (1206) a second plurality of signal processing chains (1105', 1105", 1105'''), in the array of signal processing chains to operating in a receive mode of operation, said second plurality of signal processing chains (1105', 1105", 1105''') having a second polarization which is different from said first polarization; generating (1208) a first test signal; transmitting (1212) the first test signal using the first plurality of signal chains (1103', 1103", 1103''') having the first polarization, each individual signal processing chain (1103', 1103", 1103''') transmitting the test signal via an antenna element (1120h, 1122h, 1124h) corresponding to the individual signal processing chain (1103', 1103", 1103'''); receiving (1214) the transmitted first test signal using the second plurality of signal processing chains (1105', 1105", 1105'''), each of the second plurality of signal chains using an antennal element (1120v, 1122v, 1124v) corresponding the individual signal processing chain (1105', 1105", 1105''') to receive the test signal; and determining (1218) based on the signals received by the second plurality of signal processing chains (1105', 1105", 1105''') non-idealities in the transmitted signal that was received by the second plurality of signal processing chains (1105', 1105", 1105''').

The techniques of various embodiments may be implemented using software, hardware and/or a combination of software and hardware. Various embodiments are directed to apparatus and/or systems, wireless communications systems, e.g., wireless communications systems supporting beamforming and calibration of controllable gain and/or controllable phase elements e.g., in RX/TX front ends and/or calibration of pre-distortion, communications devices supporting beamforming and calibration of controllable gain and/or controllable phase elements e.g., in RX/TX front ends and/or calibration of pre-distortion, a device including one or more arrays of RX/TX front ends, a device including H-Pol TX/RX front ends including controllable gain elements and controllable phase elements, and V-Pol TX/RX front ends including controllable gain elements and controllable gain elements, H-Pol feedlines, V-Pol feed lines, H-Pol antenna elements, and V-Pol antenna elements, a controller, passive combine/distribute circuitry, a baseband receiver, a baseband transmitter including a digital pre-distorter, a test signal generator, an error determination component, a calibration determination component, a calibration controller, a processor, RF drivers, controllable RX/TX switches, and a DPD calibration device, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system supporting beamforming and calibration of controllable gain and/or controllable phase elements e.g., in RX/TX front ends, and/or calibration of pre-distortion, communications devices supporting beamforming and calibration of controllable gain and/or controllable phase elements e.g., in RX/TX front ends, and/or calibration of pre-distortion, a device including one or more arrays of RX/TX front ends, a device including H-Pol TX/RX front ends including controllable gain elements and controllable phase elements, and V-Pol TX/RX front ends including controllable gain elements and controllable gain elements, H-Pol feed lines, V-Pol feed lines, H-Pol antenna elements, and V-Pol antenna elements, a controller, passive combine/distribute circuitry, a baseband receiver, a baseband transmitter including a digital pre-distorter, a test signal generator, an error determination component, a calibration determination component, a calibration controller, a processor, RF drivers, controllable RX/TX switches, and a DPD calibration device, a controller, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a system supporting beamforming and calibration of controllable gain and/or controllable phase elements e.g., in RX/TX front ends, and/or calibration of pre-distortion, communications devices supporting beamforming and calibration of controllable gain and/or controllable phase elements e.g., in RX/TX front ends, and/or calibration of pre-distortion, a device including one or more arrays of RX/TX front ends, a device including H-Pol TX/RX front ends including controllable gain elements and/or controllable phase elements, and V-Pol TX/RX front ends including controllable gain elements and controllable gain elements, H-Pol feed lines, V-Pol feed lines, H-Pol antenna elements, and V-Pol antenna elements, a controller, passive combine/distribute circuitry, a baseband receiver, a baseband transmitter including a digital pre-distorter, a test signal generator, an error determination component, a calibration determination component, a calibration controller, a processor, RF drivers, controllable RX/TX switches, and a DPD calibration device, a UE device, a controller, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a controller, access point, with a processor which includes a component corresponding to each of the steps of the various described methods performed by the device in which the processor is included. In some but not all embodiments a device, wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method a wireless communications device such as an access point a controller, etc. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of calibrating a plurality of signal processing chains of a communications device, the method comprising:
    setting a first gain control value to a first value to control a first gain element in a first signal processing chain;
    transmitting a first test signal from a first antenna element of the first signal processing chain of said plurality of signal processing chains, said first antenna element have a first polarization, said first polarization being a horizontal polarization or a vertical polarization;
    receiving the first test signal using a second antenna element of a second signal processing chain of said plurality of signal processing chains, said second antenna element having a second polarization, said second polarization being different from said first polarization and being one of a horizontal polarization or a vertical polarization;
    measuring the received first test signal, wherein measuring the received first test signal includes determining a received signal strength;
    determining an amplitude error corresponding to the received first test signal;
    generating a first amplitude adjustment value for the first gain element of the first signal processing chain based on the measured received signal strength of the received first test signal;
    setting the first gain control value to a third value to control the first gain element in the first signal processing chain;
    transmitting a second test signal from the first antenna element of the first signal processing chain;
    receiving the second test signal using the second antenna element of a second signal processing chain;
    measuring the received second test signal, wherein measuring the received second test signal includes determining a received signal strength corresponding to the received second test signal;
    determining an amplitude error corresponding to the received second test signal; and
    generating a second amplitude adjustment value for the first gain element of the first signal processing chain based on the measured received signal strength of the received second test signal.

2. The method of claim 1, wherein the first signal processing chain further includes a first phase shift element, the method further comprising:
    setting a first phase shift control value to a second value to control the first phase shift element in the first signal processing chain;
    wherein measuring the received first test signal further includes measuring the phase of the received first test signal;
    determining a phase error corresponding to the first received first test signal; and generating a first phase shift adjustment value for the first phase shift element of the first signal processing chain based on the measured received signal phase of the received first signal.

3. The method of claim 2, wherein the first amplitude adjustment value is a gain correction value which is combined with a desired gain control value for a beam direction to generate a gain control value which is stored in a beam table and which is used to control the first gain element to transmit a data signal.

4. The method of claim 3, wherein the first phase shift adjustment value is a phase correction value which is combined with a desired phase shift control value for a beam direction to generate a phase shift control value which is stored in a beam table and which is used to control the first phase shift element to transmit a data signal.

5. The method of claim 2, further comprising:
setting the first phase shift control value to a fourth value to control the first phase shift element in the first signal processing chain, wherein at least one of: the first value is different from the third value or the second value is different than the fourth value;
wherein measuring the received second test signal further includes determining the phase of the received second test signal;
determining a phase error corresponding to the received second test signal; and
generating a second phase shift adjustment value for the first phase shift element of the first signal processing chain based on the measured received signal phase of the received second test signal.

6. A method of calibrating a plurality of signal processing chains of a communications device, the method comprising:
setting a first gain control value to a first value to control a first gain element in a first signal processing chain;
transmitting a first test signal from a first antenna element of the first signal processing chain of said plurality of signal processing chains, said first antenna element have a first polarization, said first polarization being a horizontal polarization or a vertical polarization;
receiving the first test signal using a second antenna element of a second signal processing chain of said plurality of signal processing chains, said second antenna element having a second polarization, said second polarization being different from said first polarization and being one of a horizontal polarization or a vertical polarization;
measuring the received first test signal, wherein measuring the received first test signal includes determining a received signal strength;
determining an amplitude error corresponding to the received first test signal;
generating a first amplitude adjustment value for the first gain element of the first signal processing chain based on the measured received signal strength of the received first test signal;
setting a second gain control value to a fifth value to control a second gain element in a third signal processing chain in said plurality of signal processing chains;
transmitting a third test signal from a third antenna element of the third signal processing chain, said third antenna element have the first polarization;
receiving the third test signal using the second antenna element of the second signal processing chain;
measuring the received third test signal, wherein measuring the received third test signal includes determining a received signal strength corresponding to the received third test signal;
determining an amplitude error corresponding to the received third test signal; and
generating a third amplitude adjustment value for the second gain element of the third signal processing chain based on the measured received signal strength of the received third test signal.

7. The method of claim 6, wherein the third signal processing chain further includes a second phase shift element, the method further comprising:
setting a second phase shift control value to a sixth value to control the second phase shift element in the third signal processing chain;
wherein measuring the received third test signal further includes measuring the phase of the received third test signal;
determining a phase error corresponding to the received third test signal; and
generating a third phase shift adjustment value for the second phase shift element of the third signal processing chain based on the measured received signal phase of the received third test signal.

8. A method of calibrating a plurality of signal processing chains of a communications device, the method comprising:
setting a first gain control value to a first value to control a first gain element in a first signal processing chain;
transmitting a first test signal from a first antenna element of the first signal processing chain of said plurality of signal processing chains, said first antenna element have a first polarization, said first polarization being a horizontal polarization or a vertical polarization;
receiving the first test signal using a second antenna element of a second signal processing chain of said plurality of signal processing chains, said second antenna element having a second polarization, said second polarization being different from said first polarization and being one of a horizontal polarization or a vertical polarization;
measuring the received first test signal, wherein measuring the received first test signal includes determining a received signal strength;
determining an amplitude error corresponding to the received first test signal;
generating a first amplitude adjustment value for the first gain element of the first signal processing chain based on the measured received signal strength of the received first test signal;
switching the first signal processing chain from a transmit mode of operation to a receive mode of operation;
switching the second signal processing chain from a receive mode of operation to a transmit mode of operation;
setting a third gain control value to a seventh value to control a third gain element in the second signal processing chain;
transmitting a fourth test signal from the second antenna element of the second signal processing chain;
receiving the fourth test signal using the first antenna element of the first signal processing chain;
measuring the received fourth test signal, wherein measuring the received fourth test signal includes determining a received signal strength corresponding to the received fourth test signal;

determining an amplitude error corresponding to the received fourth test signal; and
generating a fourth amplitude adjustment value for the third gain element of the second signal processing chain based on the measured received signal strength of the received fourth test signal.

9. The method of claim 8, further comprising:
setting a third phase shift control value to an eighth value to control a third phase shift element in the second signal processing chain;
wherein measuring the received fourth test signal further includes measuring the phase of the received fourth test signal;
determining a phase error corresponding to the received fourth test signal; and
generating a fourth phase shift adjustment value for the third phase shift element of the second signal processing chain based on the measured received signal phase of the received fourth test signal.

10. A communications device comprising:
a plurality of signal processing chains; and
a processor for controlling the communications device to perform the steps of a calibration method, the steps including:
  setting a first gain control value to a first value to control a first gain element in a first signal processing chain;
  transmitting a first test signal from a first antenna element of the first signal processing chain of said plurality of signal processing chains, said first antenna element have a first polarization, said first polarization being a horizontal polarization or a vertical polarization;
  receiving the first test signal using a second antenna element of a second signal processing chain of said plurality of signal processing chains, said second antenna element having a second polarization, said second polarization being different from said first polarization and being one of a horizontal polarization or a vertical polarization;
  measuring the received first test signal, wherein measuring the received first test signal includes determining a received signal strength;
  determining an amplitude error corresponding to the received first test signal;
  generating a first amplitude adjustment value for the first gain element of the first signal processing chain based on the measured received signal strength of the received first test signal;
  setting the first gain control value to a third value to control the first gain element in the first signal processing chain;
  transmitting a second test signal from the first antenna element of the first signal processing chain;
  receiving the second test signal using the second antenna element of a second signal processing chain;
  measuring the received second test signal, wherein measuring the received second test signal includes determining a received signal strength corresponding to the received second test signal;
  determining an amplitude error corresponding to the received second test signal; and
  generating a second amplitude adjustment value for the first gain element of the first signal processing chain based on the measured received signal strength of the received second test signal.

11. A communications method, the method comprising:
setting a first plurality of signal processing chains, in an array of signal processing chains, to operate in a transmit mode of operation, signal processing chains in the first plurality of signal processing chains having a first polarization;
setting a second plurality of signal processing chains, in the array of signal processing chains, to operate in a receive mode of operation, said second plurality of signal processing chains having a second polarization which is different from said first polarization;
generating a first test signal;
transmitting the first test signal using the first plurality of signal processing chains having the first polarization, each individual signal processing chain, in the first plurality of signal processing chains, transmitting the first test signal via an antenna element corresponding to the individual signal processing chain;
receiving the transmitted first test signal using the second plurality of signal processing chains, each individual signal processing chain, of the second plurality of signal chains, using an antennal element corresponding the individual signal processing chain to receive the first test signal;
determining based on signals received by the second plurality of signal processing chains non-idealities in the transmitted first test signal that was received by the second plurality of signal processing chains;
generating an additional test signal, said additional test signal being a different test signal than the first test signal;
transmitting the additional test signal using the first plurality of signal processing chains having the first polarization, each individual signal processing chain, of the first plurality of signal processing chains, transmitting the additional test signal via an antenna element corresponding to the individual signal processing chain;
receiving the transmitted additional test signal using the second plurality of signal processing chains, each individual signal processing chain, of the second plurality of signal chains, using an antenna element corresponding the individual signal processing chain to receive the additional test signal; and
determining based on signals received by the second plurality of signal processing chains non-idealities in the transmitted additional test signal that was received by the second plurality of signal processing chains.

12. The method of claim 11, further comprising:
checking if the non-idealities in the transmitted additional signal that was received by the second plurality of signal processing chains is below a threshold corresponding to an acceptable number of non-idealities; and
when the non-idealities are above the threshold, modifying signal pre-distortion performed on a baseband test signal to include signal pre-distortion determined based on the signals received by the second plurality of signal processing chains; and
when the non-idealities are at or below the acceptable number of non-idealities, storing current baseband pre-distortion settings; and
using the baseband pre-distortion settings to control signal pre-distortion when transmitting data using signal processing chains in said first plurality of signal processing chains.

13. The method of claim 12, further comprising:
repeating said steps of: i) generating an additional test signal; ii) transmitting the additional test signal using the first plurality of signal chains having the first polarization, ii) receiving the transmitted additional test signal using the second plurality of signal processing chains, each individual signal processing chain, of the second plurality of signal processing chains, using an antenna element corresponding the individual signal processing chain to receive the additional test signal; and iv) determining based on signals received by the second plurality of signal processing chains non-idealities in the transmitted additional test signal that was received by the second plurality of signal processing chains and v) checking if the non-idealities in the transmitted additional signal that was received by the second plurality of signal processing chains is below a threshold corresponding to an acceptable number of non-idealities until the determined non-idealities are at or below said threshold.

14. The communications method of claim 11, further comprising:
setting the first plurality of signal processing chains in the array of signal processing chains to operate in a receive mode of operation;
setting the second plurality of signal processing chains, in the array of signal processing chains to operate in a transmit mode of operation;
generating a second test signal;
transmitting the second test signal using the second plurality of signal processing chains having the second polarization, each individual signal processing chain, in the second plurality of signal processing chains, transmitting the second test signal via an antenna element corresponding to the individual signal processing chain;
receiving the transmitted second test signal using the first plurality of signal processing chains, each individual signal processing chains, of the first plurality of signal chains, using an antenna element corresponding the individual signal processing chain to receive the second test signal; and
determining based on the signals received by the first plurality of signal processing chains non-idealities in the transmitted second test signal that was received by the first plurality of signal processing chains.

15. The method of claim 14, further comprising:
checking if the non-idealities in the transmitted second test signal that was received by the first plurality of signal processing chains is below the threshold corresponding to an acceptable number of non-idealities; and
when the non-idealities are above the threshold, modifying signal pre-distortion performed on a baseband test signal to include signal pre-distortion determined based on the signals received by the first plurality of signal processing chains; and
when the non-idealities are at or below the acceptable number of non-idealities, storing current baseband pre-distortion settings for use when transmitting using the second plurality of signal processing chains; and
using the baseband pre-distortion settings to control signal pre-distortion when transmitting data using signal processing chains in said second plurality of signal processing chains.

16. The method of claim 11, wherein first polarization is horizontal polarization and wherein said second polarization is vertical polarization.

17. The method of claim 16, wherein said each of said first plurality of signal processing chains includes a horizontal polarization TX/RX front end, an antenna feed line and a horizontal polarization antenna element.

18. The method of claim 17, wherein said each of said second plurality of signal processing chains includes a vertical polarization TX/RX front end, an antenna feed line and a vertical polarization antenna element.

19. A communications device comprising:
an array of signal processing chains; and
a processor for controlling the communications device to perform the steps of a calibration method, the steps including:
setting a first plurality of signal processing chains in the array of signal processing chains to operate in a transmit mode of operation, signal processing chains in the first plurality of signal processing chains having a first polarization;
setting a second plurality of signal processing chains, in the array of signal processing chains, to operate in a receive mode of operation, said second plurality of signal processing chains having a second polarization which is different from said first polarization;
generating a first test signal;
transmitting the first test signal using the first plurality of signal processing chains having the first polarization, each individual signal processing chain, in the first plurality of signal processing chains, transmitting the test signal via an antenna element corresponding to the individual signal processing chain;
receiving the transmitted first test signal using the second plurality of signal processing chains, each individual signal processing chain, of the second plurality of signal processing chains, using an antenna element corresponding the individual signal processing chain to receive the first test signal;
determining based on signals received by the second plurality of signal processing chains non-idealities in the transmitted first test signal that was received by the second plurality of signal processing chains;
generating an additional test signal, said additional test signal being a different test signal than the first test signal;
transmitting the additional test signal using the first plurality of signal processing chains having the first polarization, each individual signal processing chain, of the first plurality of signal processing chains, transmitting the additional test signal via an antenna element corresponding to the individual signal processing chain;
receiving the transmitted additional test signal using the second plurality of signal processing chains, each individual signal processing chain, of the second plurality of signal chains, using an antenna element corresponding the individual signal processing chain to receive the additional test signal; and
determining based on signals received by the second plurality of signal processing chains non-idealities in the transmitted additional test signal that was received by the second plurality of signal processing chains.

* * * * *